US009565246B1

(12) United States Patent
Tsypliaev et al.

(10) Patent No.: US 9,565,246 B1
(45) Date of Patent: Feb. 7, 2017

(54) SYSTEM AND METHOD FOR PROJECT AND PROCESS MANAGEMENT BY SYNCHRONIZING CUSTOM OBJECTS BETWEEN AN APPLICATION AND EXTERNAL SERVER

(71) Applicants: Maxim V. Tsypliaev, Moscow (RU); Peter E. Volynskiy, Moscow (RU)

(72) Inventors: Maxim V. Tsypliaev, Moscow (RU); Peter E. Volynskiy, Moscow (RU)

(73) Assignee: Comindware Ltd., Tortola (VG)

( * ) Notice: Subject to any disclaimer, the term of this patent is extended or adjusted under 35 U.S.C. 154(b) by 133 days.

(21) Appl. No.: 14/245,130

(22) Filed: Apr. 4, 2014

Related U.S. Application Data

(63) Continuation-in-part of application No. 13/419,753, filed on Mar. 14, 2012, now Pat. No. 8,725,821.

(51) Int. Cl.
*H04L 29/08* (2006.01)

(52) U.S. Cl.
CPC ..................... *H04L 67/10* (2013.01)

(58) Field of Classification Search
CPC .............................. H04L 67/10; G06Q 10/107
See application file for complete search history.

(56) References Cited

U.S. PATENT DOCUMENTS

| | | | | |
|---|---|---|---|---|
| 6,671,757 B1 * | 12/2003 | Multer | ................ | H04L 67/1095 707/999.201 |
| 8,370,442 B2 * | 2/2013 | Ahn | ..................... | G06Q 10/107 707/610 |
| 2005/0149908 A1 * | 7/2005 | Klianev | ................ | G06F 9/5038 717/109 |
| 2007/0022155 A1 * | 1/2007 | Owens | .................... | G06Q 10/10 709/202 |
| 2012/0109887 A1 * | 5/2012 | Ziemann | ........... | G06F 17/30876 707/610 |
| 2012/0130945 A1 * | 5/2012 | i Dalfo | ............. | G06F 17/30578 707/610 |
| 2013/0006926 A1 * | 1/2013 | Erofeev | .............. | G06F 11/1456 707/610 |
| 2013/0198132 A1 * | 8/2013 | Khosravy | ......... | G06F 17/30371 707/610 |
| 2014/0006967 A1 * | 1/2014 | Arumugam | ........... | G06F 9/4443 715/748 |

* cited by examiner

*Primary Examiner* — Uzma Alam

(74) *Attorney, Agent, or Firm* — Bardmesser Law Group

(57) ABSTRACT

A system for synchronizing Custom Objects between an application and an External server includes an application interfacing to a server for synchronizing standard objects supported by the application; a plurality of Custom Objects stored on the External server, wherein the Custom Objects are not supported by the application, the application interfacing to the External server for synchronizing Custom Objects; the application storing a plurality of standard objects. The standard objects are converted to Custom Objects types supported by the Custom Object manager. The application includes a Custom Object manager for managing the Custom Objects. At least one of the Custom Object type has a workflow. The Custom Objects include a discussion with a hierarchy of comments.

28 Claims, 17 Drawing Sheets

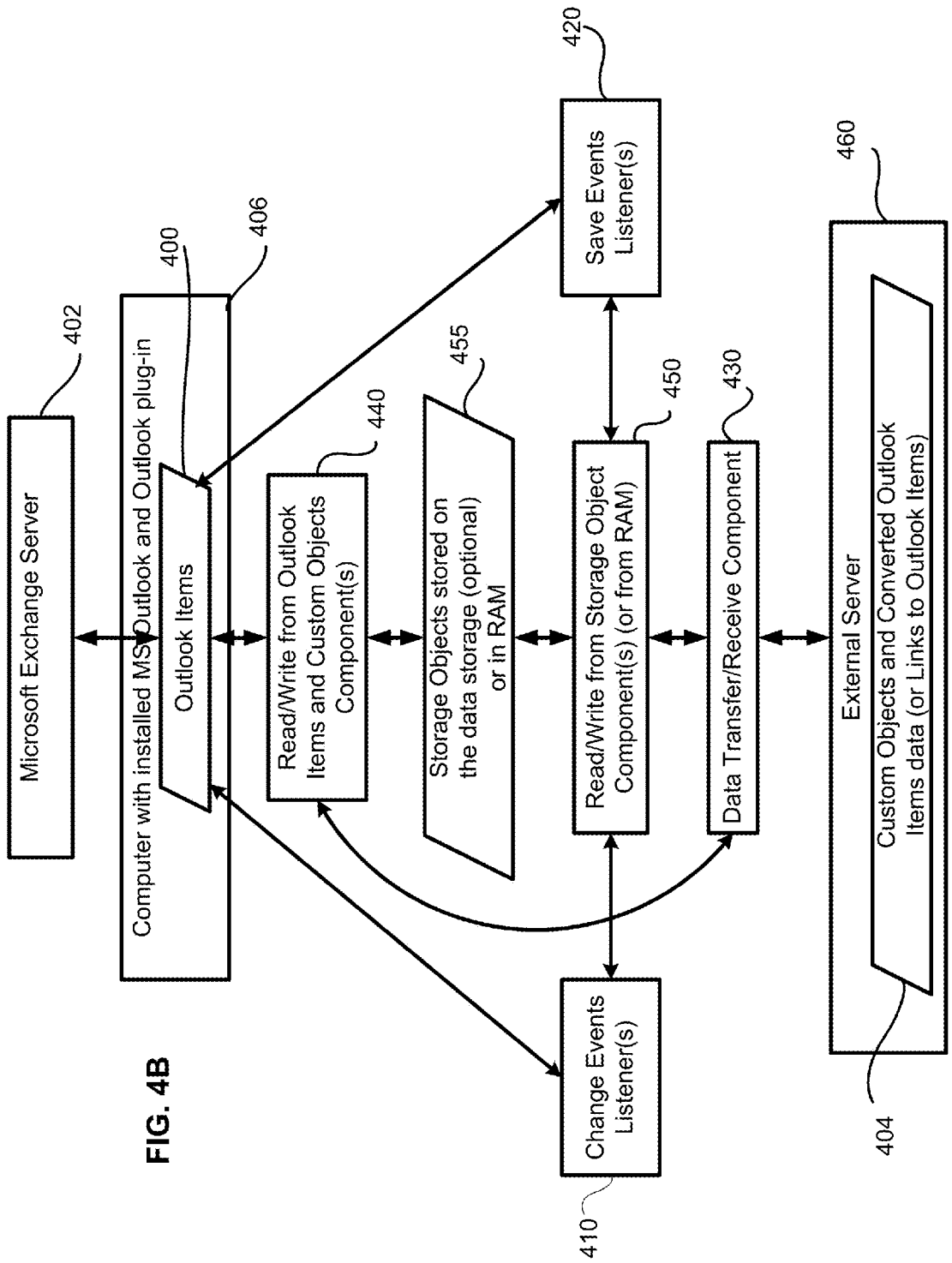

FIG. 15

SYSTEM AND METHOD FOR PROJECT AND PROCESS MANAGEMENT BY SYNCHRONIZING CUSTOM OBJECTS BETWEEN AN APPLICATION AND EXTERNAL SERVER

BACKGROUND OF THE INVENTION

Field of the Invention

The present invention is related to data synchronization, and more particularly, to a system and method for synchronizing custom workflow and task-related objects between an application and an External server.

Description of the Related Art

MICROSOFT Outlook has become a primary mail application used by millions of users all over the world. MICROSOFT Outlook allows you to efficiently work with many business objects (and the Custom Objects, discussed below), such as mail, tasks, meetings, appointments, etc. However, MICROSOFT Outlook (and other similar email clients) does not natively allow you to work with business objects that have advanced Workflow behind them (such as, e.g., Issues, Projects, Business Processes, Customer claims, Requests, etc). These Workflows are executed on an External server. Given the popularity of MICROSOFT Outlook as an email client, and the absence of native support for workflow-based business objects, it is desirable to be able to support work with business objects with Workflow from within MICROSOFT Outlook interface (as well as from other standard email clients that do not normally support such functionality).

Therefore, there is a need in the art for a system and method for synchronizing data between MICROSOFT Outlook email clients (and similar clients) and an External server, where the data is stored in such a manner that the data is constantly updated.

SUMMARY OF THE INVENTION

The present invention is related to data synchronization, and more particularly, to a system and method for synchronizing Custom Objects between an email client and an External server, that substantially obviates one or several of the disadvantages of the related art.

In one aspect of the invention, a method for data synchronization is provided. Custom Objects are stored on an External server. Outlook Items are stored on a MICROSOFT Exchange server as Outlook Items.

The invention can be implemented as an MS Outlook plug-in. The plug-in provides an ability to connect with the system of process manager systems, project manager system, Comindware™ Task manager and others, so that Custom Objects, which are part of the process, workflow or projects, can be managed (changed, moved, edited). The task can be created from an e-mail or from other Custom Objects. The states of the process can be changed.

The Custom Objects and Outlook Items can be managed in an on-line and in an off-line modes, i.e., if the External server is off-line, the user can edit the objects off-line and save them locally. The saved objects will be stored to (synchronized with) the External server after the External server comes on-line.

In one implementation of the invention can be represented as an integrated to the MICROSOFT Outlook software, to the SharePoint, or to any software, such as e-mail clients.

Also implementation of this invention can be an independent application such as a mobile application, a tablet application, a netbook application, etc.

The process checks if there are changes in the Custom Objects, and if these changes are saved on the persistent storage, such as hard disk drive, or are saved on the External server. Another process can check if there are changes in the Outlook Items, and if these changes are saved on persistent storage, or are saved on the MS Outlook server (MS Exchange Server). MICROSOFT Storage Items are used to store information about the fields of the Outlook Items, that have been changed in RAM and fields of Outlook Items that have been saved to the persistent storage. Custom objects are used to store information about the fields of the Custom objects that have been changed (for example, in RAM, or on the local hard disk drive, on the storage of the user computer device with installed client application) and of the Custom objects (for, example, Outlook Items converted to Custom objects) that that have been saved or on the External server storage, such as a hard disk drive of the External server.

Then, information about both changed and saved fields (of Custom Objects and Outlook Items) is sent to the External server and to MS Exchange Server. The collected information for Custom Objects is stored to the External server, and the collected information about Outlook Items is usually stored to the MS Exchange server. Subsequently, notifications about successful saving of the fields on the External server and on the MS Exchange server are received. Note that notifications about successful saving of the Outlook Items fields are not necessary, since these two processes (saving Outlook Items fields and saving Custom objects) can be independent of each other. The information about the fields changed on the External server is received, as well. The fields changed in Custom objects are stored on the External server. For example, an entire object can be overwritten, or only internal fields can be overwritten within the changed Custom Object.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIGS. 4A-4B illustrates a system architecture, in accordance with the exemplary embodiment;

FIG. 15 illustrates a screenshot of a task creation interface, in accordance with the exemplary embodiment;

DETAILED DESCRIPTION OF THE PREFERRED EMBODIMENTS

Figure 1:
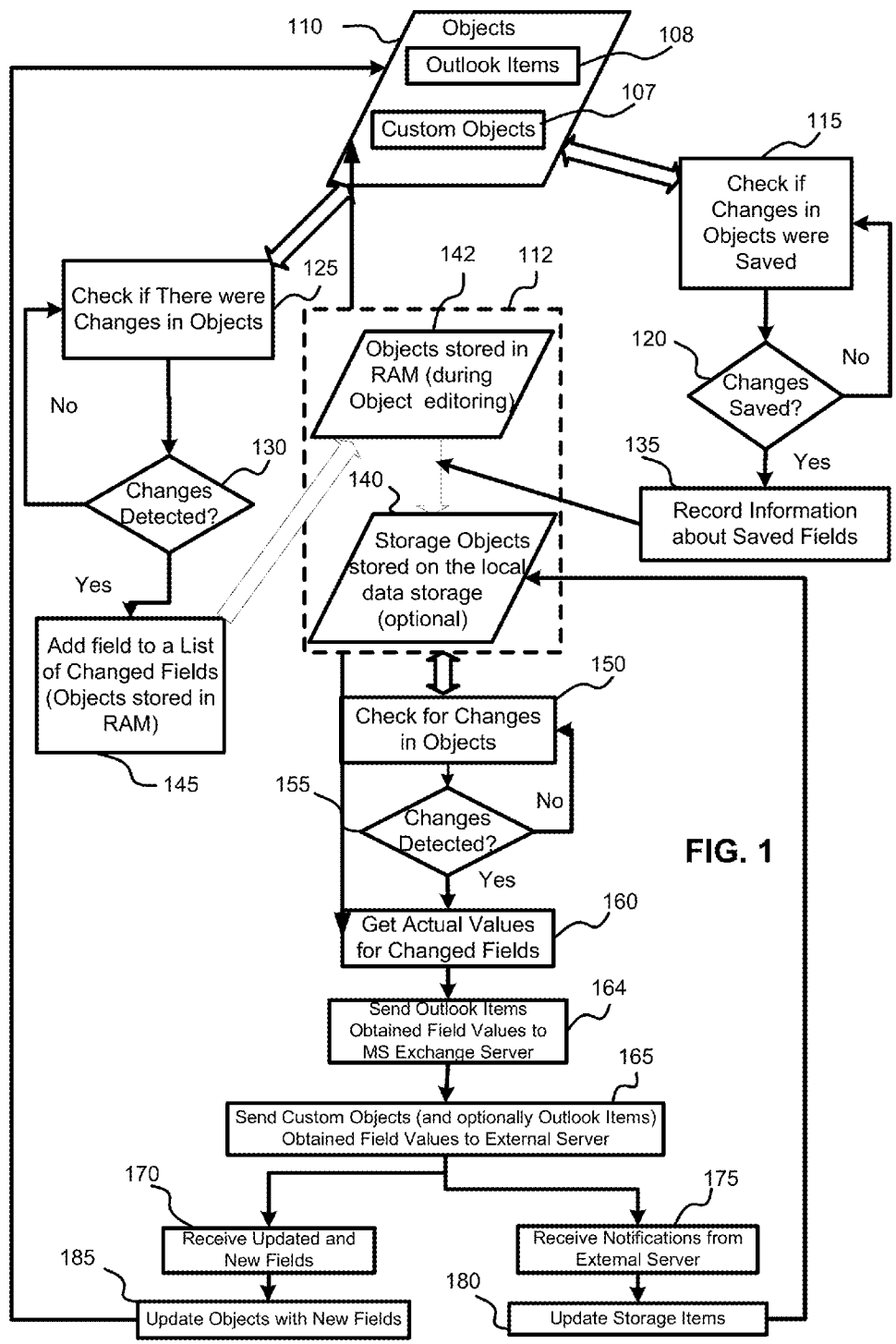
FIG. 1 illustrates a method for synchronizing Custom Objects and MICROSOFT Outlook Items between MICROSOFT Outlook Add-in and an External server, in accordance with the exemplary embodiment.

Reference will now be made in detail to the preferred embodiments of the present invention, examples of which are illustrated in the accompanying drawings.

In this discussion, MICROSOFT Outlook 2010 is used as an example, although the invention contemplates the use of any software application, such as organizer, planner, email client application (mail user agent (MUA)) that allows to design custom interface and show the relevant data in it, such as a desktop application that is used to work with emails and/or such objects as Contacts, Tasks, Calendar, Workflow, Documents, Discussion, History, Chat, Internet Forum, etc. It is possible to use particular email client and other software applications for managing Custom Objects if they support designing of custom forms and showing custom data. MICROSOFT Outlook 2010 is used in the description as one such example, since it is one of most popular email clients and satisfies requirements. Lotus Notes is another example, although the invention is not limited to any particular email client.

Custom Objects can be converted and saved to MICROSOFT Outlook as MICROSOFT Outlook Items, which can include data in a standard format of MICROSOFT Outlook (i.e., the format of the email client), and can include data in a custom format for storing an information, which can be visualized and processed by custom manager (discussed below).

Also MICROSOFT Outlook Items (application objects, application items) can be converted and saved to External server. MICROSOFT Outlook Items can be used in conjunction with Custom objects. For example, MICROSOFT Outlook e-mail, Outlook Items or part of Outlook Item can be attached to Custom Object, or can be included to the Custom Object. Outlook Item or it part can be converted to a format which is supported by a Custom Object. For example, a field of e-mail message "From" can be saved to or attached to Custom Object as a text. Also, a picture attached to an e-mail can be converted to internal format of Custom Object and saved to it or attached to it. Also, any object of an e-mail or field of an e-mail (a date of creation, e-mail body text, addressee, sender, status, priority, etc.) of can be saved to Custom Object internal fields or attached to the Custom Object. Note that the parts of tasks, of a workflow, of projects (etc.), or the tasks themselves can be used, such as e-mails. For example, fields "assignee", status fields "Opened", "Closed", "Pending", "priority", etc.

In one embodiment of the invention, user can manage the Custom Objects and Outlook Items via Outlook plug-in. Custom objects are shown in the folder, for example, "Comindware" folder (with Custom Objects management) can be shown and used such as Calendar or Contacts.

Custom objects (Comindware™ objects) can be shown and managed in the third-party software environment (such as Microsoft Outlook, Lotus Notes, Microsoft SharePoint, etc.) Comindware objects (Custom Objects), including the workflow, the state management, the task, documents, can be managed inside the MICROSOFT Outlook. Note that Outlook Items can be converted to Custom Objects.

According to the exemplary embodiment, special processes continuously check The process check if there are changes in the Custom Objects and if these changes are saved on the persistent storage, such as hard disk drive, or are saved on the External server. Another process can check if there are changes in the Outlook Items (108, FIG. 1) and if these changes are saved to the persistent storage, or are saved to the MS Outlook server (MS Exchange Server). MICROSOFT Storage Items (a part of 112, FIG. 1) are used to store information about the fields of the Outlook Items, that have been changed in RAM (a part of 142, FIG. 1) and fields of Outlook Items that have been saved to the persistent storage (a part of 140, FIG. 1). Note that Storage objects (140, FIG. 1) is an optional step, so objects (MS Outlook Items and Custom objects) can be transferred to (synchronized with) the External server and the MS Exchange server directly from the RAM. Custom objects are used to store information about the fields of the Custom storage objects (custom storage items) that have been changed, for example, in RAM (a part of 142, FIG. 1), or on the local hard disk drive (a part of 140, FIG. 1), on the storage of the user computer device with an installed client application) and of the Custom objects (for example, Outlook Items converted to Custom objects) that that have been saved or on the External server storage, such as a hard disk drive of the External server.

The information reflecting both changed and saved fields is sent to the External server and to the MS Exchange server. Subsequently, notifications about successful saving of the fields on the External server are received. The information about the fields changed on the External server is received back, as well. The fields changed on the External server are saved to the Custom objects, and the fields changed on the MS Exchange server are saved to the MICROSOFT Outlook Items and/or to Custom Objects (as mentioned above, the data from the MS Exchange server can be converted to Custom format and saved with Custom Objects, or can be attached to Custom object, for example, as files in custom formats for fields of Microsoft Outlook Item's fields, in well-known file-formats for pictures, texts, documents, tables, etc.). Thus, the synchronization between MICROSOFT Outlook Items (such as e-mail, documents, tasks, etc.) and the External server and MS Exchange server is achieved. And the synchronization between Custom Objects and the External server is also achieved.

According to an exemplary embodiment, a synchronization solution is implemented as a MICROSOFT Outlook Add-in (plug-in) developed with, for example, MICROSOFT Office Tools for Developers. Communication with the External server is implemented through a custom API (Application Programming Interface) as follows:

a. The MICROSOFT Outlook Add-in forms a list of objects that are subject to synchronization and stored in Custom objects on the local hard disk drive or in MICROSOFT Outlook. Also, for some objects (Custom Objects, Microsoft Outlook Items), there is additional information regarding edited fields or deleting of an object, as shown below:

| Obj1 | Obj2 | Obj3 | Obj4 | Obj5 | Obj8 | Obj9 |
|---|---|---|---|---|---|---|
| Field3:NewValue | | | Deleted | Field3:NewValue<br>Field7:NewValue<br>Field9:NewValue | New<br>Field6:NewValue | |

"Deleted" means that the object was deleted. "Field#: NewValue" means that in a relevant Object, the value of Fields# was changed to NewValue. "New" means that the object was created by email client and is sent to an External server in a first time.

b. After receiving the data, the External server applies changes to objects (Custom Objects, MS Outlook Items, Traditional objects, for example, text files, picture files, tables files, video files, scripts files, program code files, compiled program code files) stored on the External server. Note that the script files saved on the External server, scripts included to the custom object, compiled program code, or any executable code stored near or within Custom Objects can be executed during the opening of the Custom Objects by the Microsoft Outlook commands, by commands of Microsoft Exchange Server, commands of External server or by applications installed on the these servers, or executed from an external device.

Such executable code or scripts can be used for automatic determination of Object of destination (place to where it will be copied from the External or from the MS Exchange server), for automatic compilation of files attached to Object for automatic executing of attached files, for establishing links between Custom Objects, between fields of Custom Objects, between Custom Objects and Microsoft Outlook Items, between Microsoft Outlook Items. These links can be used for triples creation for workflow-related Custom Objects (discussed below).

c. If there is a conflict, i.e., when data on the External server data is different from the data on local data storage (for example, hard disk drive with installed MICROSOFT Outlook and Application), data on the External server is not changed, and an error message is sent to the application (for example, to MICROSOFT Outlook Add-in/plug-in). The data in MICROSOFT Outlook and the application is restored to External server values (because data on the External server is presumed to be more correct than data in MICROSOFT Outlook and MICROSOFT Outlook Add-in, although the user can reverse this presumption through Add-in settings). Also, this presumption can be tuned-up on the External side, for example, by the External server administrator.

d. The External server forms a response to be sent to the MICROSOFT Outlook Add-in. All updated fields of changed Objects (Custom object and linked Microsoft Outlook Items) are sent, which applies to both Objects that were changed in MICROSOFT Outlook Add-in (as discussed in the previous paragraph) and Objects that were changed on the External server. Confirmation about applying the changes to Objects stored on the External server is also sent to the MICROSOFT Outlook Add-in. Information about a time of a last successful synchronization is stored in the MICROSOFT Outlook Add-in, and the following information is sent by the External server to the MICROSOFT Outlook Add-in:

| Obj1 | Obj5 | Obj8 | Obj35 | Obj6333 | Obj4 |
|---|---|---|---|---|---|
| Field1:Value | Field1:Value | Field1:Value | Field1:Value | Field1:Value | Deleted |
| Field2:Value | Field2:Value | Field2:Value | Field2:Value | Field2:Value | |
| Field3:Value | Field3:Value | Field3:Value | Field3:Value | Field3:Value | |

Note that a time of a last successful synchronization, information of Custom Objects' changed fields, attached files, etc., can be stored on the External server. Also, Custom Objects can be changed on the local side (user side, a computer with installed Microsoft Outlook and Microsoft Outlook Add-in) and stored directly on the External server (without storing Custom Objects' data on the local data storage). Outlook Items can be stored on the local storage and on the Microsoft Exchange server, so Outlook Items can be synchronized further. Also, locally stored Custom Objects can be synchronized with External server Custom Objects.

e. Tasks, Comments, History, Attachments, Discussion, Workflow Graphs, e-mails, tasks, etc. are synced similar to Custom Objects, so several additional lists are formed:
  i. For all comments added to (or attached to) all Objects
  ii. For all attachments added to (or attached to) all Objects
  iii. For all history added to (or attached to) all Objects
  iv. For all discussions added to (or attached to) all Objects
  v. For all graphs added to (or attached to) all Objects
  vi. For all diagrams added to (or attached to) all Objects
  vii. For all tasks added to (or attached to) all Objects
  viii. For all e-mails added to (or attached to) all Objects In case of attaching file in MICROSOFT Outlook Add-in, the attachment is uploaded directly to the External server, and a link to this attachment is sent as a Value of the field "AttachmentLink" to the External server. In case of attaching file at the External server, a link is also sent as Value of the "AttachmentLink" field to MICROSOFT Outlook Add-in, and it downloads the file and attaches it to MICROSOFT Outlook Item. "Deleted" key word is also used to indicate that the attachment was deleted.

Triples (or quadruples) can represent business objects and rules implemented in any programming language or Comindware® expression language. Also, the assignment rule can be implemented in rules of inference (inference rules, transformation rules). An inference rule is the act of drawing a conclusion based on the form of premises interpreted as a function, which takes premises, analyses their syntax, and returns a conclusion (or conclusions). According to the exemplary embodiment, special names can be used for transition rules for business process. The names can be:

$property, that identifies an object;
$$now, indicating current data and time; and
$$currentUser, identifying a current user.

The business rules can be stored as triples as well. The triples can be used for tasks generated by a state machine. The conditions of relationships between the state machine's states can serve as predicates of the triple. Since a state machine is directly related to the workflow (shown as circles and arrows 1032 and 1035-1050 in FIGS. 10 and 11), then, essentially, the Workflow is the reflection of the state machine. That is, the state of the workflow and the next stage on the workflow is determined by the state machine (i.e. workflow operates according to the state machine). The tasks can be generated automatically by the state machine (or they can also be created manually). The tasks can be displayed and edited; e.g., a letter or email can be converted into a task (manually, though it is possible convert a letter into a task automatically). There is also an option to add the newly created task, a new state, new transitions for the state (transitions from the one state to another) or a letter (including their constituent parts, such as attachments, discussion, documents, links to other letters and constituent parts) to the workflow.

A state machine, also called a finite-state machine (FSM) or finite-state automaton, is a mathematical model used to design computer programs and digital logic circuits. The state machine is as an abstract machine that can be in one of a finite number of states. The state machine can be in only one state at a time. The state of the machine at any given time is called the current state. The state machine can transition from one state to another when a triggering event or a condition occurs. A state machine is defined by a list of possible transition states from each current state) and the triggering condition (event) for each state transition.

State machines can model a large number of problems, among which are electronic design automation, communication protocol design, parsing and other engineering applications. State machines (or hierarchies of state machines) are used to describe neurological systems in biology research. State machines can be used to describe the grammars of natural languages in an artificial intelligence research and in linguistics studies.

A state describes a behavioral node of a system. The node waits for a trigger event in order to execute a transition into another state. Typically, a state is introduced when the system does not react to the same trigger even in the same manner.

Notation3, or N3, as it is more commonly known, is a shorthand non-XML serialization of Resource Description Framework (RDF) models, designed with human-readability in mind. The N3 is much more compact and readable than XML RDF notation.

The N3 has several features that go beyond a serialization for RDF models, such as support for RDF-based rules. Turtle is a simplified RDF-only subset of the N3.

A collection of RDF statements intrinsically represents a labeled directed multi-graph. As such, an RDF-based data model is more naturally suited to certain kinds of knowledge representation than the relational model and other ontological models. However, in practice, the RDF data is often persisted in a relational database or native representations also called triplestores or quadstores, if context (i.e., a named graph) is also persisted for each RDF triple. As the RDFS and the OWL demonstrate, additional ontology languages can be built upon the RDF.

Two common serialization formats are in use. The first is an XML format. This format is often called simply the RDF (Resource Description Framework). Notation 3 (or N3) is a non-XML serialization of RDF models designed to be easier to write by hand, and in some cases, easier to follow. Because it is based on a tabular notation, it makes the underlying triples encoded in the documents more easily recognizable compared to the XML serialization. N3 is closely related to the Turtle (Terse RDF Triple Language) and N-Triples formats.

In order to speed up storage and retrieval of data, the data is stored in a form of triples, quadruples, quintuples, etc., in a B-tree. B-trees are data structures that allow operations on dynamic data sets. The operations can be search, search for minimum and maximum values, insert, delete, reference to parent or child directory. The tree can be used as a dictionary or as a prioritized chain. The speed of tree operations is proportional to the height of the tree. The data is read as blocks from the same location. If a tree node is moved to an operational memory, an allocated memory block is moved and the operation executes very fast. If a number of triples exceeds, for example, a thousand, the search through triples becomes very slow and requires enormous computational resources. According to the exemplary embodiment, a B-tree is used for storing triples, quadruples (where predicate depends on three attributes), quintuples (where predicate depends on four attributes), etc., represented by graphs. Note that the actual graphs are not stored, but the corresponding triples (quadruples, quintuples, etc.) are stored in a B-tree.

According to the exemplary embodiment, data storage in a form of a B-tree is used in order to make searches more efficient. The B-tree can be implemented as a set of tables. According to the exemplary embodiment, predicates, objects and subjects are stored in a database in a hashed from. In other words, task, status and owner values can be hashed prior to storage in the table. Hashing allows for speed up of a search process by sorting the hash values within the database.

The database search is performed by predicates in order to find relations between the graph peaks. Thus, a key table in the database is a table containing relations between the predicates, the subjects and the objects. The predicates in the key table are sorted. Table of predicates contains predicates used for selecting the subjects and the objects.

Note that this method of storing data is not limited to tasks of the triples. The data of quadruples, etc., can be stored in the key table. Links in the key table are values in the predicate table that represent links to tables of relations between the subject and the objects. The predicates table also contains links to tables with the relations between the subject and the objects.

Graphs are used to visually represent triples, quadruples, quintuples, etc. Also, triples can be stored in a B-tree. These triples (i.e. graphs) can be serialized by means of RDF. Notation 3 (N3) is the most popular method of non-XML RDF-model serialization. The RDF-model is very simple and abstract, essentially a directed graph with some additions and remarks, but it can be serialized in different ways. Usually, these are: N3, N-Triples, Turtle,RDF/XML,RDFa. N3 is chosen as an example. RDF can be used to serialize a document or specific knowledge fragments from a document, as well as real-world objects, e.g. a real living person (some IT-specialists are baffled by this notion).

URI is the universal identifier. URI looks like a simple URL-link, though it is somewhat different. It can be used to define various resources, e.g., a real person: "http://example.org/people#Peter".

Consider a relational-based application and see what needs to be modified. To make it more difficult, the modifications should be applied after the application has been started—e.g, change the data model, connect a new entity to the user object, such as an address (which typically has more than one string, employing different fields for house no., city/town, street, etc.). To do all this, a table should be amended; some new tables possibly should be created, then linked to each other; some data access procedures should also undergo some changes; the web-service should be fixed. The user interface also might need be changed. This is a fair amount of work for the user.

It would be much easier, if only a couple of fields were added to the interface, and a new statement for each of new fields was added (this minimum could also be done without, if the interface was designed as a more universal one). If the RDF-model is used, everything would be like that, since every data in the storage is an SPO (subject-predicate-object) statement.

In project management, a task is an activity that needs to be accomplished (or executed) within a defined period of time. A task can be assigned to a responsible person. The task has a start and end date (time). A task is a unit that is used to track user activities in terms of completing certain objectives defined by the task description. Note that transitions from state to state are implemented by closing the corresponding tasks and auto-creating (auto-generating) new task for the next state of the workflow. The task can be closed with a transition to one of available states chosen by a person who closed the task. If only one available state exists, the process moves to this state automatically after the task is closed. Additionally, when closing the task and moving to the next state, the person can add a comment.

A requirement for task generation is incorporated into the workflow for each state that needs a task to be generated. A task state parameter provides for automatic generation of tasks during transitions from one state into another. Usually only rules that are recursive are important; i.e., rules such that there is an effective procedure for determining whether any given formula is the conclusion of a given set of formulae according to the rule. The rule is a set of conditions that bring new facts on the basis of existing facts. An example of a rule that is not effective in this sense is the infinite w-rule.

Each auto-generated task has a title that is derived from an object name and a state name. The state contains auto-generated (or manually adjusted) task assignment data defined by the workflow. Additionally, the task can contain object description and comments. Note that some task fields are auto-generated and some fields can be modified by the task assignee. According to the exemplary embodiment, the task can have a parent property that contains a link to a parent object (i.e., item) that owns the task. Thus, the tasks with the same links to the parent object belong to the same item. A user can view all tasks for the parent object by using the link.

Each task can have at least one sub-task. The sub-tasks are created manually or automatically. In order to close the task, all the sub-tasks have to be closed. A sub-task can be created, if the entire task cannot be executed as a single entity for some reason. For example, a bug cannot be fixed unless it is reviewed by a lead software developer. In this case, a sub-task is created for the lead software developer. Thus, the task cannot be closed until the lead software developer closes his sub-task. According to the exemplary embodiment, workflow-related data, template data, item fields, tasks and other service data can be stored in a database in a form of triples (or in another format). According to the exemplary embodiment, template data defines rules and requirements for transition to the next state. An example of a task is a task within MS Outlook.

Other examples of tasks can be fixing a bug in a computer code, report generation, replacing a car part, cargo transport, writing an executable computer module, etc. For example, the business process can be controlled by a state machine. Then, the workflow data can be represented by a triples (or, more generally, n-tuples) representing stages of the process (i.e., states of the state machine), a task and an assignee of the task, etc. Note that the tasks may not be generated during the transition to the next state (i.e., for the next state). The conditions of relationships between the state machine's states can serve as predicates of the triple. These triples can be stored in databases, for example in the form of a B-tree.

A workflow can have multiple tasks, attached documents, statuses of project, statuses of tasks, and assignees for tasks for each state of the process. The data can be represented, for example, by quadruples or quintuples, as well.

As noted above, a user who is responsible for the particular state can select that state (for example, if a task needs to be closed in order to transition, then the user to whom the task is assigned can close the task and select the next state). Additional restrictions are placed on the Object (Item) upon transition to the next state (state2) ("state2_restrictions"), and the Object must satisfy those restrictions. "state2_triggers" are the changes in the fields, which need to occur upon transition to state2. "state2_task_triggers" are the changes in the subtask, formed upon transition to state2. "state2_need_create_task" defines whether a task needs to be generated in the current state. "state2_task_assignee" is a user expression for calculating the assignee of the task being generated. "transition1" is the transition from state1 to state2.

"transition1_restrictions" are restrictions that the Object (for example, Custom object) has to satisfy when transitioning according to "transition1". "transition1_triggers" are the changes in the fields that occur during the transition based on "transition1". These variables, constants and expressions can be stored in the triplestore, which is read and processed during a transition from one state to another.

Restrictions are user expressions, written in expression language (see above), which can be processed, and which take as an input the ID of the Item, and as an output provide a notification of whether the Item can transition to the next state. The ID is an identifier (e.g., a string or alphanumeric), that identifies the Item. The triggers are also user expressions written in expression language, which are processed and take as an input the ID of the Item, and provide, as an output, some field of the Item or task, and which value needs to be written in that field. The user expression can use the properties of the Item or task (and Items related to that Item or task, as described above), and special variables, also described above.

FIG. 1 illustrates a method for synchronizing Custom Objects and Miscrosoft Items between MICROSOFT Outlook Add-in and an External server. The Objects include Microsoft Outlook Items and Custom Objects. The MICROSOFT Outlook Items 111 are standard MICROSOFT Outlook objects that are used to store all MICROSOFT Outlook entities (such as, for example mail, contacts, tasks, schedules, appointments, etc.). The MICROSOFT Outlook Items are stored in RAM for temporary storage and have associated records on persistent storage (for example, on a hard disk drive) of a computer system. In block 125, a process checks for changes in the objects and in the Outlook Items (optional). Custom objects (custom items) are used to store information about the fields of the Custom items that have been changed. Custom Object are similar of MICROSOFT Outlook Items, but can contain data from the fields of MICROSOFT Outlook Items (converted or not) that Outlook does not natively support, MICROSOFT Outlook Item itself (such as e-mails, meetings, tasks and other), also can contain additional items and information, such as Tasks (for example in Comindware® Tracker or Comindware® Project formats), Comments (Comments have a hierarchical structure, so users can post new comments or reply to other's comments), History, Attachments—that is, standard attached files and attached Custom Objects—tasks, documents, files, Discussion, History, Workflow Graphs (note that MICROSOFT Outlook doesn't have any workflow routines at all. MICROSOFT Outlook, MICROSOFT Outlook plug-ins and other external applications are unable to work with workflows, that is, move between states, edit states, edit the workflow, or even create new states), e-mails, tasks, etc., as discussed above. Note, herein the MICROSOFT Outlook is considered as an application, as well as MICROSOFT Outlook plug-ins, MICROSOFT Outlook-like applications and other applications, which have at least the functionality of the MICROSOFT Outlook namely the processing the tasks. Also, note that the plug-in can be an independent application with own server (such as MICROSOFT Exchange Server for MICROSOFT Outlook) and own External Server.

Tasks and History from the "Comindware® Tracker" or "Comindware® Project" (products for task, process and project management) can be stored in the triples, n-tuples (or in the another format) to triplestores. The triplestore is a special database for the storage and retrieval of triples. The triple is a data entity composed of subject-predicate-object, such as, for example, "John is 35" or "John knows Helen."

Much like in a relational database, the information is stored a triplestore and can be retrieved using a query language. However, unlike a relational database, the triplestore is optimized for the storage and retrieval of triples. In addition to queries, the triples can be imported/exported using Resource Description Framework (RDF) and other formats.

The triplestores can store billions of triples. The triplestores can be built as proprietary database engines or they can be built on top of existing commercial relational database engines. The RDF data model is similar to classic conceptual modeling approaches, such as entity-relationship or class diagrams. The RDF is based upon making statements about resources (in particular, Web resources) in the form of subject-predicate-object expressions.

These expressions are known as triples in RDF terminology. The subject denotes the resource, and the predicate denotes traits or aspects of the resource and expresses a relationship between the subject and the object. For example, one way to represent the notion "The sky has the color blue" in RDF is as the triple: a subject denotes "the sky," a predicate denotes "has the color", and an object denotes "blue."

The process of block 125 uses MICROSOFT Outlook events to register all changes made in the MICROSOFT Outlook Items. Also, a custom listener (a software event listener which can track the changes of the objects (fields of objects, states of objects, etc.) such as new or changed text in the text fields, a status of the task, a position of an employee, priority of the task, a project status changes, etc.) can be used to register all changes in the Custom Objects and in the MICROSOFT Outlook Items. Then, if the changes are detected in block 130, the process records them to a list of changed fields in RAM in block 145.

The list of changed fields can be replaced by a bitmap of changed fields, or by a bitmap of changed properties of objects. For example, the properties can be presented by additional files or objects for current objects. These files can contain a queue of the changes was made with the object, so this queue can be applied to the object on the External server side during the process of object copying to the External server. Also this queue can be saved to the External server to return to previous version of Custom Object or MICROSOFT Item, or to work with object with this changes queue as an Custom Object was changed (unchanged object+ changes queue=changed objects (virtually)). The server keeps the data. Suppose some changes have been made (e.g., a task has been created or modified and so on), and the changed data has been sent to the External server. The changes have not been actually applied to the data on the external server, but have been written to the changelist (a change log, containing new data as well as logs for them to be written in, i.e., a change log for object modifications), so that they will be applied later (or much later, once a month, for example). For the server to work and enable the data to be read (latest data, which has been modified, but the changes have not been actually applied yet), the latest data is being accessed via some insert: a combination of old data and the change log. Thus, actual data is received "virtually".

A list of fields that have been changed in the MICROSOFT Outlook Items and Custom Objects is recorded on-the-fly into the "Objects stored in RAM" 142 which is the part of Objects Storage 112. Note that not only a list of changed fields is recorded, but the actual field values can be written to Object Storage. The list of changed fields can be represented by an array, or a strings, hashes, a set of hashes. Note that a list of changed fields can be updated after every change in the MICROSOFT Outlook Item and Custom Object. A list of changed fields can be created for every MICROSOFT Outlook Item and Custom Object after the item or Custom Object will be opened or will be edited.

A bitmap of the fields and files of the opened-for-editing MICROSOFT Outlook Item or Custom Object can be created. This bitmap can store data for fields and state (which can be changed, added or deleted) of the Custom Objects. Also, a list of changed fields can be cleared or deleted for currently opened MICROSOFT Outlook Item or Custom Object if the user or system (for example, in case of critical error) will not save changes for this item. The data about changed fields (with changed data itself) can be stored in the list of changed fields and addition files on the storage devices, on the cloud storage. The cloud storage is a model of networked enterprise storage where data is stored in virtualized pools of storage which are generally hosted by third parties. The External server (with stored Items and Custom Objects) can be a cloud server with cloud storages and storages for storing software executive code for running the software, which can handle Custom Objects and Items.

A list of changed fields is optional, since changed fields can be recorded to a "Objects Storage stored in RAM" 142, or can be transferred to the External server or to Microsoft Exchange server.

The Miscrosoft Outlook Items can be stored in the format of Custom Objects (for example as the object part (or custom items), such as tasks or discussions texts, inside the Custom Object), or links (for example, in triples format) to them can be added to Custom Objects. Also the MICROSOFT Outlook Items can be stored on the Microsoft Exchange server or can be placed to External server. The benefits of this approach are flexibility and speed of data adding, editing, searching and deleting, as described above.

Each part of Custom Object can be linked with other Custom Objects. For example, Project 1 "Map drawing" (The Process of drawing a map with advertisement information, such as a location of cafes, restaurants, sport-centers . . . ) can be linked with Project 2 "Search advertisers", in which the employees must find advertisers for advertising.

The MICROSOFT Storage Items 112 are MICROSOFT Outlook objects and MICROSOFT Outlook Items that are used to store service information of applications, such as an application that is used to work with emails and such objects as Contacts, Tasks, Calendar, etc. Custom objects are used to store information of applications, such as custom tasks (a custom tasks is a task in the format of the External server and the custom application for processes and projects managing), the custom workflow, the custom process (for example, the process "Hire new web developer" can have its own workflow with tasks, its own state machine for all steps (or for some steps) in the workflow, a discussion, a hiring time limit, rules for transition from one state to other, rules for automatic adding of files (such as employee resume) based on a regular expression language, Comindware® language). In the exemplary embodiment, the Objects Storage 112 are used to store information about the changed fields and about the saved fields (discussed below) of items and objects.

If new changes are not detected in block 130, the process keeps checking the Outlook Items and Custom Objects for changes in block 125. Subsequently, the process checks for saved Outlook Items and Custom Objects in block 115. Then, if the saved changes are detected in block 120, the process records information about the saved fields in block 135

This process records the fact that fields have been saved to the Storage objects. Technically, it means adding Boolean value (or "1" and "0") to an array of changed fields stored in the Storage objects. Note that a table, a hash-map, a hash-table, data-strings, and/or data-streams to External server or a file can be used, instead of an array. In other words, after the changes will be saved, then "Storage objects stored in RAM" 142 will update "Storage objects stored on the data storage" 140 with last changes, which were made after the previous save operation. So the last changes that were saved can be erased from the "Storage Items stored in RAM" 142.

Storage Objects can be transferred to the External server and stored or applied to stored Custom Objects or/and Microsoft Outlook Items on the External server side and on the side of Microsoft Exchange server.

Storage Objects can be stored on the data storages (such as network data storages, NAS, cloud storages, etc.) of the External server and/or of the Microsoft Exchange. If new changes are not detected in block 120, the process keeps checking the Outlook Items and Custom Objects for saving events in block 115. In block 150, the process checks for changes in the "Storage objects stored on the data storage" 140. This step is optional, since the data (fields of the Custom Objects) to be saved can be stored in the RAM or can be transferred to the External server. An addition filter can be used to check is the save command was received. The addition filter can be implemented as a computer code or script (for example java script) to track the save events of object fields. The process continuously checks the Objects 140 and/or addition filter for information about new saved fields (that were marked as saved in block 135).

Storage objects can be stored in RAM or in persistent storage. When working with Outlook Items and Custom Objects, i.e., the tasks are not edited, the Storage Items need only to be stored in persistent storage (if they have already been created but not yet synced with the External server). When the Outlook Item or Custom Object is opened for editing, the Storage object stored in persistent storage is copied to RAM (or a part of Custom Object or Outlook Item, for example, where only some fields can be copied), after which all changes to the Storage Items are done to the copy in RAM. When the user or application or system saves the changes, the persistent storage copy of the Item is updated. To sync with the External server, data about the changed fields is taken from persistent storage or from the addition filter.

Additional changes filter can be released as a software (executable) code, an application, script with own storage for storing data to be written to the External server.

The process of the synchronization is started in step 150 and will be described below.

If new changed and saved fields are detected in block 155, the process gets the actual values for changed fields in block 160. The process reads the MICROSOFT Outlook Items and Custom Objects and gets the actual values for the fields that were detected as saved in block 155. For each field marked as saved, the updated field value is retrieved and sent to the External server in block 165 and to the Microsoft Exchange server in block 164 (if necessary)). Also, new objects, files, documents and related changed objects are retrieved and sent to the External server and the Microsoft Exchange Server. If new saved fields are not detected in block 155, the process keeps checking the objects 140 for new saved fields in block 150.

In block 170, the process receives information about updated and new fields including values from the External server. New fields are fields that were changed, for example, by another user in another email client, by the server's system administrator or were changed via Internet browser. Also, these fields can be different fields from the updated fields in step 160. Then, in block 185, the process updates MICROSOFT Outlook Items and Custom Objects with the new fields. In block 175 the process receives notifications about saving fields (updating a part of objects, changed object fields) on the External server. This process is supported by a custom API. Subsequently, in block 180, the process updates the objects 140 with information reflecting that the fields have been successfully saved on the External server.

This means that the records about both the changed and the saved fields have now been deleted from the Objects 140.

The process may use RAM instead the objects 140. In this case data from the External server will not be saved on the local data storage. But Microsoft Items can be stored as Storage Items. So, if the objects are stored on the local data storage (for example such data can be stored from time to time for work off-line, for example) the Microsoft Outlook Items data can be stored separately from the Custom Objects (and Custom Objects' data, such as files, texts, etc.). The Custom Objects and Outlook Items can be managed in the on-line and in the off-line modes, i.e., if the External server is off-line, the user can edit the objects off-line and save them locally (for example, to an SQL database, MSSQL Compact, etc.). The saved objects will be stored to the External server (synchronized) after the External server comes on-line.

The data within database can be stored as triples. Also note the database can be implemented as an object database, such as Jasmine, Versant, POET, ObjectStore PSE, etc.

Some object-oriented databases are designed to work with object-oriented programming languages such as Delphi, Ruby, Python, Perl, Java, C#, Visual Basic .NET, C++, Objective-C and Smalltalk; others have their own programming languages. OODBMSs use exactly the same model as object-oriented programming languages.

An object database (also object-oriented database management system) is a database management system in which information is represented in the form of objects as used in object-oriented programming. Object databases are different from relational databases which are table-oriented. Object-relational databases are a hybrid of both approaches. In this case, an internal language can be used for data managing (writing, reading, searching, coping the data, etc.).

Figure 2:
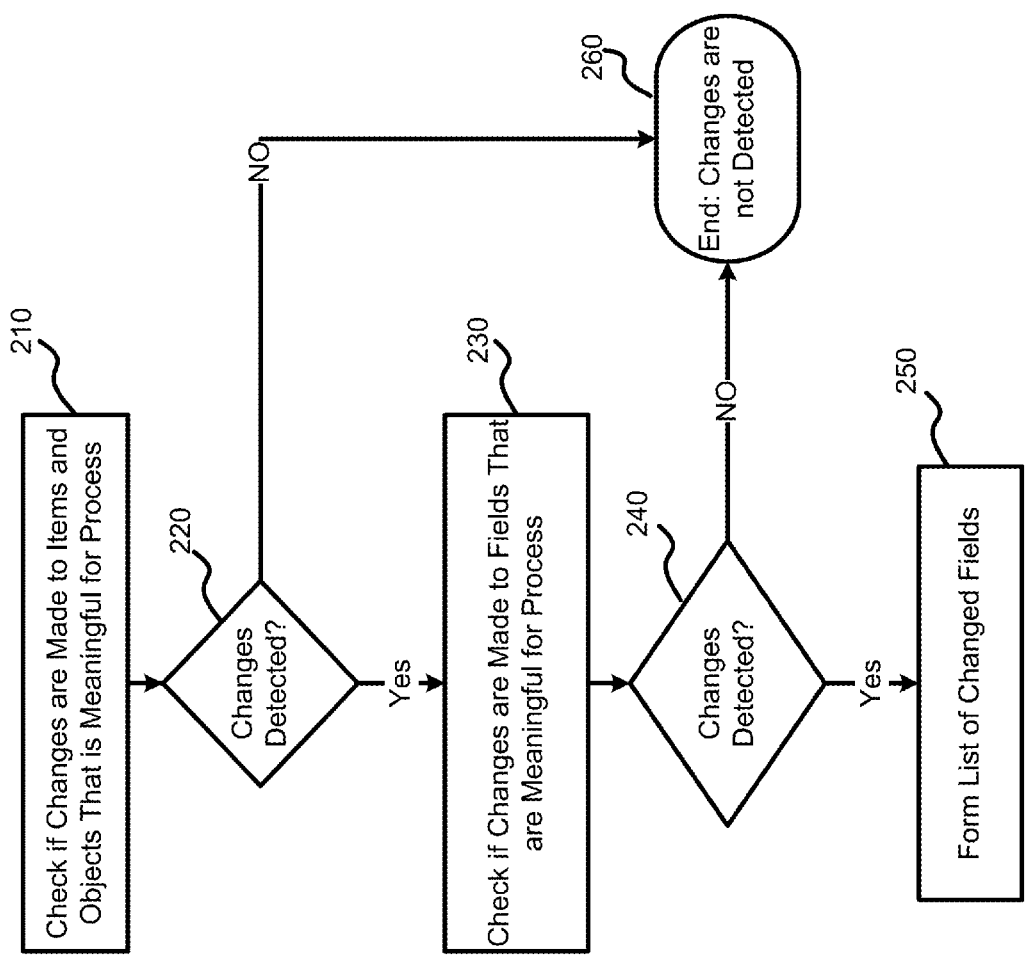
FIG. 2 illustrates a block diagram for forming a list of changed fields of Custom Objects and application Items, in accordance with the exemplary embodiment.

FIG. 2 illustrate a block diagram for forming a list of changed fields, in accordance with the exemplary embodiment. In block 210 the synchronization application checks if the changes have been made to an item and/or object meaningful to the process. Meaningful changes, in the exemplary embodiment, are the changes that are made to an application item (discussed below) or to a Custom, or Comindware® Object (named after the assignee of this application) since this object is being essentially synchronized (unlike many MICROSOFT Outlook operations that do not affect the contents of an item). A Comindware® Object is an Object that has some Workflow behind it and is stored on the External server. Also Comindware® Objects can has no workflow, for example, documents with discussion. Comindware® Objects can be, for example: Claims, Support Requests, Vacation Requests, Vacancies, Candidates, Employees, Travel Expenses Reports, Software Bugs, Feature Proposals, Insurance Applications, Purchase Orders, Medical Reports, Change Requests, Hardware Assets, Software Assets, Test Cases, Time-off Requests, etc. If Custom Objects are not supported by standard email client without changes, then a Custom Object or part of it can be converted to email client items. For example, data (data from the Custom Objects, such as a date of the Custom Object creation, author of the Custom Object creation, etc.) can be received from the External server and recorded to email client items.

Also note that email client items or part of it can be converted to External server Custom Objects format and can be transferred to the External server. In that form, they can be stored on the External server, and the External server can more easily work with them, in its own format, rather than in the format of the email client. The server can have its own format for storing the Items, including both standard Outlook items and Custom Objects not normally supported by email clients. Generally, for terminology purposes, Object and Item mean a similar concept, but in MS Outlook objects are called Items, i.e., Outlook Items. In this regard, Objects have their own format and are defined more broadly than Outlook Items. The Custom Object manager can work with data in both the External server's format and Outlook (Microsoft Exchange) format.

Note that Custom Objects can be managed inside the Microsoft Outlook in a custom environment, such as a plug-in that can provide displaying, changing, applying, converting to and from (for example, converting Microsoft Outlook Items to Custom objects, such as e-mails or tasks, or converting Custom objects to Microsoft Outlook Items, change the image and text format), editing, moving (from one process to another, from one task to other tasks), deleting, checking, etc., of Custom Objects and Microsoft Outlook Items. Such actions with the objects also can be executed (also automatically) with using a built-in programming code, Comindware® language, scripts or javascript language.

Then, if changes to the meaningful Objects (Custom Objects and Microsoft Outlook Items) are detected in block 220, in block 230 the system checks if the changes have been made to meaningful fields. If the changes to the meaningful fields are detected in block 240, a list of changed fields is generated in block 250. So a list of changed fields ("Storage objects stored in RAM" 142) is updated with every changed meaningful field. If changes of meaningful fields are not detected in blocks 220 and 240, the process ends in block 260.

Figure 3:
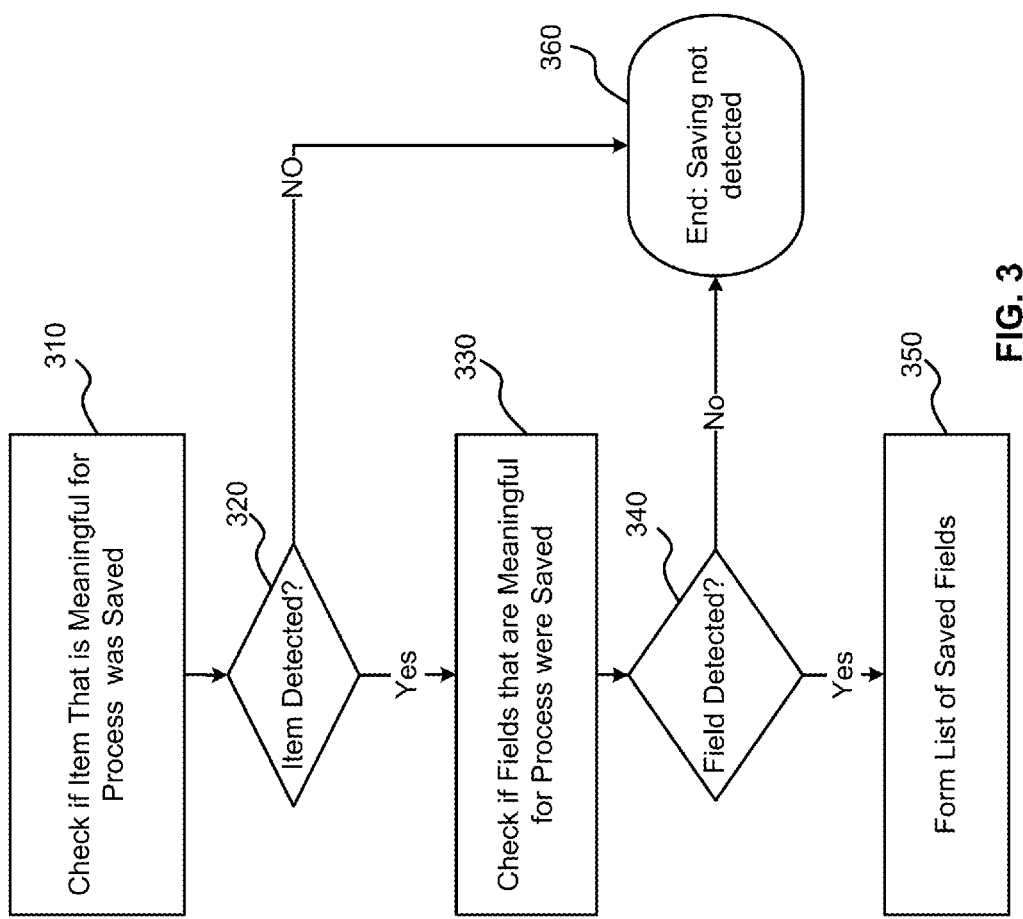
FIG. 3 illustrates a block diagram for forming a list of saved fields, in accordance with the exemplary embodiment.

FIG. 3 illustrates a block diagram for forming a list of saved fields, in accordance with the exemplary embodiment. In block 310 the synchronization application (or for an application data transfers, that saving the changed data to the External server without storing the data in the Storage objects on the local data storage) checks if the Microsoft Outlook Item or Custom Object that has been saved is meaningful to the process. Meaningful, in the exemplary embodiment, are the save events that concern Comindware® Object (Custom Object) since it is being synchronized (copied to the External server).

If saving events in the meaningful MICROSOFT Outlook Items and Custom Objects are detected in block 320, the synchronization application checks, in block 330, if the meaningful fields have been saved. If the meaningful fields are detected in block 340, a list of saved fields is generated in block 350. A process of copying of changed fields from "Storage Objects stored in RAM" 142 to "Storage Objects stored on data storage" 140 can be used for each saved field instead of creating a list of saved fields. If changes are not detected in blocks 320 and 340, the process ends in block 360.

Also note a process of copying of changed fields from "Storage Objects stored in RAM" 142 to "Storage Objects stored on a data storage" 140 can be replaced by the process of copying of changed fields from "Storage Item stored in RAM" (Microsoft Outlook Items) 142 to "Storage Objects stored on the External data storage" (list of To-Do can be created instead copying, for example, log of actions and changes can be stored as queue with attached files, documents and changes itself), or can be replaced by the process of copying of changed fields from "Storage Item stored in RAM" 142 to External Custom objects.

Figure 4A:
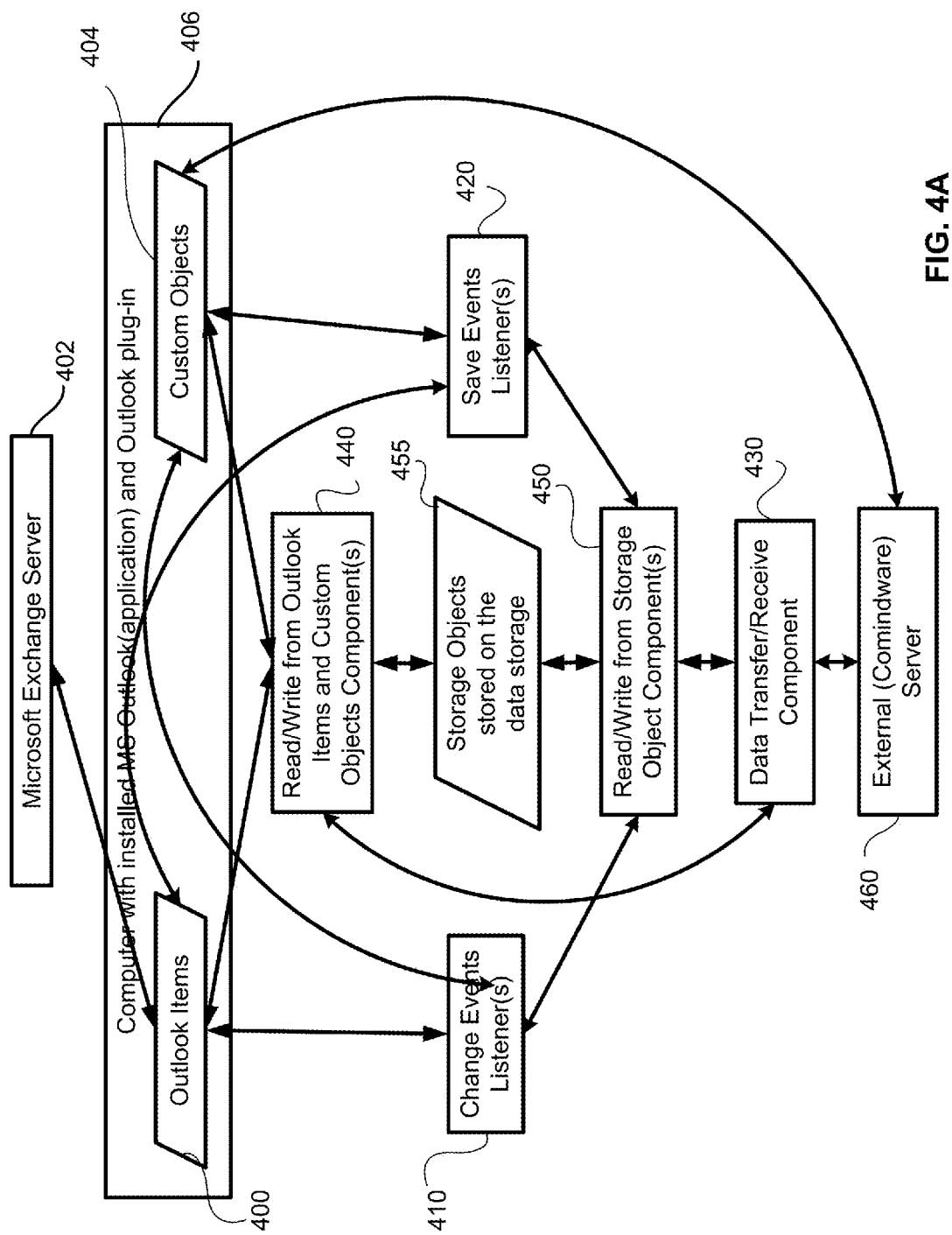

FIGS. 4A-4B illustrate system architecture, in accordance with the exemplary embodiment. In FIGS. 4A-4B, a change events listener component 410 is intended to listen/track for events that indicate changes in Outlook Items 400, in Custom Objects 404 (optionally) stored on the External server 460 (and part of it can be optionally stored on the local data storage) and in Converted Outlook Items data (optionally can be stored on the External server). MS Outlook Items data can be converted and stored on the External server if necessary, but are usually stored on the MS Exchange server 402. Here, Outlook Items 400 represent standard Outlook Items, parts of which are stored in the Storage Objects, in the RAM and on the Microsoft Exchange Server 402. Also, Custom Objects are stored on the External server 460, or stored both on the External server and on the local data storage (in the form of Storage Objects) 455. A save events listener component 420 is intended to listen for events that indicate saving of the Outlook Items 400 and Custom Objects 404 (optionally). A read/write from the Outlook Items 400 and Custom Objects (optionally) component 440 (optionally) is intended to read information from the Outlook Items 400 and Custom Objects 404 (optionally) to check, if there were changes and then write the updated fields that are received from an External server 460 and Microsoft Exchange Server 402.

A read/write from the Storage Objects component 450 is intended to write information about changed fields and about saved fields received from the components 410 and 420 respectively (this component is an optional component and can be replaced by a component to read/write from the RAM). Then the component 450 reads information on both changed and saved fields from the Storage Objects 455 (or from the stored in the RAM Objects) to trigger a process of sending updated fields to the External server 460 and to Microsoft Exchange Server 402 by a data transfer/receive component 430. This component is intended to send the fields updated in the Custom Objects to an External server 460 and receive updated fields from the External server 460. Also, a data transfer/receive component 430 is intended to send the fields updated in the Outlook Items to the Microsoft Exchange Server 402.

Note the Custom Objects can be stored only on the External server without intermediate local storage, i.e., the Storage Items are not created for the Custom Objects.

Also, note that the Change Events Listener and Save Event Listener can normally be used only for application items, but not for Custom Objects. The changing and saving of the data of the Custom Objects can be performed independently from the MICROSOFT Outlook events (more generally, independently of the events in the application). The MICROSOFT Outlook events are such events as the creation, deletion, assigning, forwarding, changing, etc. of the Outlook items, such as the email, task, meeting, etc. The MICROSOFT Outlook events can be ignored by the plug-in. In this case, only the Custom Objects are managed directly by the plug-in, i.e., the objective here is the Custom Object and MICROSOFT Outlook Items are dependent items for the Custom Objects. MICROSOFT Outlook Items can be linked with and converted to Custom Objects without changing the type of the item from the MICROSOFT Outlook directly. For example, the item/object type changing can be represented as a task creation from the email.

In one embodiment of the invention, the MICROSOFT Outlook item are synchronized be the standard built-in components of the MICROSOFT Outlook, but the Custom Objects are managed (created, edited, closed, stored, synchronized, etc.) by the components of the MS Outlook plug-in. In this case, the MICROSOFT Outlook items are available by the MICROSOFT Outlook plug-in, but the Save Event Listener and Change Event Listener are not used by the MICROSOFT Outlook plug-in for the Custom Object synchronization. Instead, a direct access to the saving of the Custom Objects changes is provided.

The process of sending updated Microsoft Items (and changed fields) (unlike Custom Objects) can be performed by the internal mechanisms both of the Microsoft Outlook and Microsoft Exchange Server.

According to another exemplary embodiment, the synchronization application provides tight integration with MICROSOFT Outlook. The synchronization part of the application (Comindware® Task Manager, Comindware® Tracker, Comindware® Project) has a functionality of task manager, project manager, processes manager (i.e. Custom Object manager) that works with tasks, projects, processes, products, workflows, e-mails, calendar, and business processes. However, Comindware® Tasks (Custom Objects) described herein are considerably more advanced compared to standard MICROSOFT Outlook tasks. In particular, these tasks have the following additional features:

1. Discussion with hierarchy of comments posted by users;

2. History with a list of all changes made to the task, project;

3. Time log (i.e., estimated total time spent on the task);

4. Unlimited number of subtasks (including parallel tasks, for which the main task can't be closed if all of such tasks are not closed; including independent subtasks, so the parent task can be closed after the one of subtasks will be closed); and 5. Structured reference to other COMINDWARE Objects in the system. COMINDWARE Objects can be interrelated with each other through the use of hyperlinks, or automatic creation of relations. This allows to flexibly model data;

6. Workflow with tasks and subtasks. Note that MICROSOFT Outlook has no workflow at all; it does not use workflow, since it has Microsoft Outlook Items, i.e., emails, tasks, comments, meetings, contacts, appointments etc., which exist on their own and are not linked to any workflow. There are also Objects, which are somewhat similar to tasks, discussions, etc., but linked to a specific workflow. For instance, bug fixing has an Object with its own workflow with existing or adjustable states, transitions between states, task creation and finishing, letter sending, etc. (some actions from this lies are actually executed automatically by means of a state machine, workflow parameters and so on), which determines what exactly should be done in order to fix a bug.

The exemplary embodiment allows users that are used to work with MS Outlook (or with other applications) to continue working in their familiar environment. In other words, a COMINDWARE (proprietary) task manager (and other products) is integrated into MICROSOFT Outlook interface using Outlook development tools. This way the advanced tasks (advanced objects and documents) are used in MICROSOFT Outlook. The new tasks and objects can be look like typical MICROSOFT Outlook task, but are considerably broader in functionality. Users can create integrated COMINDWARE Custom objects (such as tasks), close, delete and edit them, attach them to other Custom objects, for example to workflow, to tasks; can attach documents to them (workflow, tasks), move them from one to another Custom object, include one Custom object in other Custom objects, assign Custom objects, convert Custom objects to other formats, for example Custom objects text fields can be saved manually or automatically as a text document, etc. The information is sent to a COMINDWARE® server (i.e., an External server synchronized with MICROSOFT Outlook client) and can be synchronized with MICROSOFT Exchange Server.

For example, the advanced (Custom) objects can include a discussion with hierarchy of comments posted by users. Unlike native Outlook Tasks, advanced tasks (custom tasks) have comments (and other described herein Custom objects, even the tasks itself) associated with them. Comments have a hierarchical structure, so users can post new comments or reply to other's comments. Users can edit comments they have posted. This feature provides a real-time discussion possibility within a particular task while keeping the context, which makes it much more convenient for collaboration purposes.

The advanced tasks can also have a history with a list of all changes made to a task. Each change made to a task can be seen in history in a convenient form. So the user can explore the history of all changes that have ever been made to a task. This helps solve disputed questions and/or restore unintentionally erased data.

The advanced tasks can also have a time log (time spent) reflecting a total time spent on a task. The user can log time spent on tasks in a special tab. Then, integrated reports on time spent for particular tasks can be prepared. This information is useful for billing purposes and cost analysis.

The advanced tasks can also have an unlimited number of subtasks. With subtasks the user can split the work into smaller parts and give each part to particular employee. Since the hierarchy of subtasks is unlimited, the user can manage pretty complex project with just advanced tasks. A list of all subtasks with statuses and assignees can be seen in a parent task.

Note that a Custom Object can be implemented as a task, discussion, file, document, and etc. A Custom Object can have a Custom Sub-Object, so in this case the Custom Sub-Object can be a subtask for parent Task (Custom Object), as well as a sub-discussion (and other types of the Custom Objects) is a Sub-Custom Object for the parent Custom Object (the Discussion). The Custom Sub-Object has the properties of the Custom Object and can have additional (expanded) properties. For example, the Discussion can be divided into several sub-discussions related to the parent Discussion, such as the Discussion of the "MICROSOFT Outlook plug-in implementation" can be discussed in the parent Discussion. Additional Sub-Discussions ("MICROSOFT Outlook plug-in GUI", "The plug-in interaction with the MICROSOFT Outlook API", etc.) can be opened for the parent Discussion. The Sub-Discussions of the Discussion can be related to the other Discussions, Sub-Discussions (and to other Custom Objects types and Custom Sub-Objects types), in this case, to the other Sub-Discussions. Here, a Discussion is an example, and any Custom Object can be used.

The advanced tasks can also have a structured reference to other Custom Objects in a system. Objects and Items can be interconnected with each other for navigation, statistics and quick-getting-into-context purposes. The user can set a link from a task to any object and item stored on the server or on the local data storage and then quickly navigate using that link, or links automatically created based on the analysis. The analysis is system-based and executed via program code, Notation 3 language, COMINDWARE® language, scripts, by creating triples of user data, work data, rules, templates, ontologies, axioms, etc., which contain all necessary information about objects and how they are connected with other objects and/or their parts] of the connections of these objects with other objects. Information about linked tasks will also be seen on appropriate Custom Objects. It can be seen visually, for instance, using subfolders, linked tasks lists, arrows, dot lines or names of connected objects, such as "linked with task 1" or "depending on task 1"

The links can be created based on the automatic creation of the tags (autotags). Autotags are the on-the-fly generated tags, which are used to find objects inside database (tripplestorages). Autotags can be stored to these data bases or to own databases as tripples.

Each object has fields (Name, Date of Creation, Owner, Links, Start Date, etc.) and these fields can be linked to each other with ontologies. Thus, autotags can be generated based on the object fields data and ontologies. Also autotags can be generated by using other autotags.

An ontology represents knowledge as a set of concepts within a domain, using a shared vocabulary to denote the types, properties and interrelationships of those concepts. Ontologies are the structural frameworks for organizing information and are used in artificial intelligence, the Semantic Web, systems engineering, software engineering, biomedical informatics, library science, enterprise bookmarking, and information architecture as a form of knowledge representation about the world or some part of it. The creation of domain ontologies is also fundamental to the definition and use of an enterprise architecture framework.

The Web Ontology Language (OWL) is a family of knowledge representation languages or ontology languages for authoring ontologies or knowledge bases. The languages are characterized by formal semantics and RDF/XML-based serializations for the Semantic Web. The OWL Web Ontology Language Overview describes the function and relationship of each of these components of the semantic web stack. XML provides an elemental syntax for content structure within documents, yet associates no semantics with the meaning of the content contained within. XML Schema is a language for providing and restricting the structure and content of elements contained within XML documents.

Thanks to the use of the RDF (resource definition framework), it is possible to work with different data sources (databases, data storages, which can be local, on a corporate network, or located on the Internet). It is possible to utilize a common dictionary URI, thereby permitting to integrate data from different servers. It is also possible, based on the data and the rules, to provide on-the-fly representation of the data (rather than static slices, as is done with OLAP cubes).

By way of examples of data sources that can be represented in this matter, a database (or some other type of storage) server that serves the Human Resources department can score data regarding a new employee. The same data can be used by the IT department to add the user to the corporate network. Also, the same data can be used by the accounting department to implement payments of the employees' salary.

Note that the servers can be both local (on the corporate network) or remote, for example, accessible over a wide area network, or the internet. Note also that if one of the servers is offline, this will not affect correctness of the data. For example, if the IT department's server is offline at the moment that a new employee is added by the HR department, once the IT server is back online, thanks to RD, the same person will be reflected in both business applications. The email shown is needed not just to notify the other department that a new employee has been added, but to synchronize the terminology.

For instance, to the HR department, a person is an employee, to the IT department he is a user, to the accounting department, he is a payee. With the help of RDF, the global database can reflect that global:person=HR:employee=IT:user, and then everything will be synchronized with no further efforts by anyone.

The on-the-fly data representation can be illustrated with the following example. Consider the ontology data (i.e., the data that describes the entities which are being manipulated)

in the context of business applications, for example, project management, issue tracking, bug tracking, CRM, etc. Each one is stored in its own database (or, alternatively, in a common database), and are combined at a higher level. With the aid of a logical core, it is possible to combine the various available data into different combinations and sets of ontologies, for example: using specific ontologies, a developer can see the context of the representation of the bug submitted by QA as a task, assigned to him, in other words, it is possible to track to which task each particular bug that is being worked on relates. It is also worth discussing the difference between on-the-fly representations possible with the approach described herein, and such static representations as provided by OLAP cubes (online analytical processing in real time), which is one conventional technique for generating reports and different statistical documents. OLAP cubes are frequently used by analysts to quickly process complex database queries, and are particularly commonly found in marketing reports, sales reports, data mining, and so on. The reason that OLAP cubes are so widespread is the speed with which the processing can be performed. Relational databases store the information about the various entities in separate tables, which are usually well normalized. This structure is convenient for most operational database systems, however, complex multi-table queries are usually difficult to perform rapidly. A good model for such queries (rather than for changes) is a table constructed using facts from the OLAP cube.

The tasks, documents, discussions, dates from the calendar, process states and other objects are a part of the process with the assigned workflow. The workflow can be managed by task opening, closing, assigning to, copying; by changing the states of the process, for example the moving from the state "interview with the web-developer" of the process "web-developer hiring" to the state "the web-developer hired". The task "Pay the bill for the services for the web page design" can be closed with selecting the next step of the workflow "Paid" or "Will be paid later". In this case if the workflow has some next states (steps) of the current state the rules are used for the transition from the current state to the next state. Transitions from the one state to another can be performed automatically with using the such rules as "value less than 20", "experience of at least 5 years", "if the Task 1 and Task 2 are closed and at least one task has positive decision", " ". Such rules can be written in any form, for example, for example, rules can be written in mathematical formulas, any computer language (Java, Python, Haskel, C#, etc.), scripts, internal languages, for example, Comindware language et al.

The workflow states can be viewed from the window of the Microsoft Outlook plug-in. The status (and the addition information for the state, linked objects and attached documents and files) of the state is viewed by the selecting it from the workflow schema.

The system sends a mail with the corresponding notifying after the closing the task or choosing the next step.

Also note the workflow can be created with built-in instruments (internal and external computer language, the graphical interface, resource packs, links to the computer code and other) or can be created with external programs, such as "Comindware Task Manager", "Comindware Project", "Comindware Tracker", "Comindware Process". Also, by using external applications the workflow can be managed, controlled, viewed and edited. The process (based on the corresponding to its workflow) can be started from an external application and from Microsoft Outlook.

Figure 5:
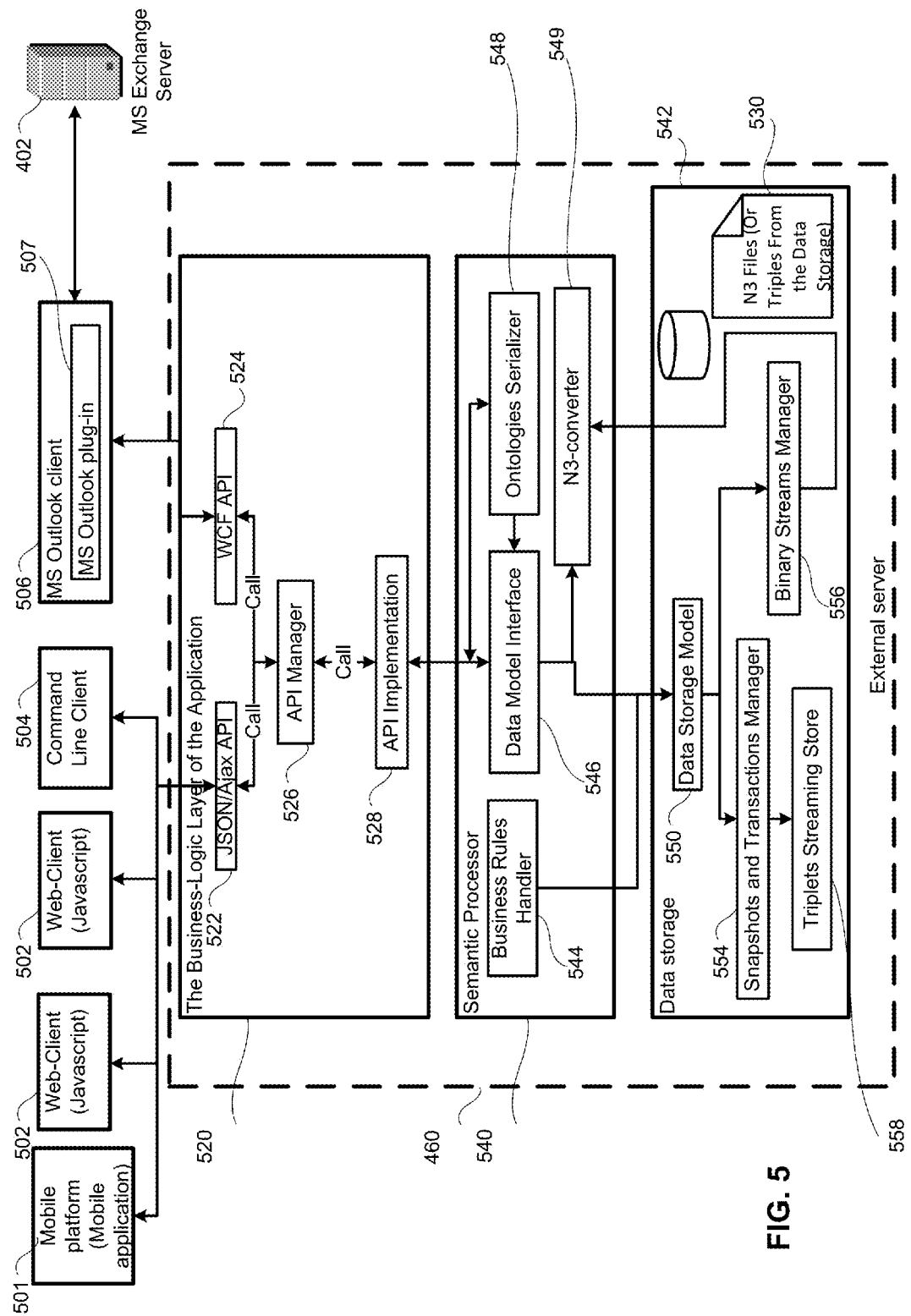
FIG. 5 illustrates the system in one implementation of the invention, in accordance with the exemplary embodiment.

FIG. 5 illustrates the system in one embodiment of the invention. JSON/Ajax API 522 is a module for the realization of the protocol of the API methods call using a JSON reporting format and with a data transmission over the HTTP using Ajax-requests.

WCF API 524 is a module that implements of the protocol of the API methods call using the XML/SOAP representation format and a data transmission over HTTP.

The API manager module 526:
searches for the required API method,
implements the arguments' serialization to the data structures used in the Business Logic ontologies,
implements API method calls,
deserializes the results returned by the method.

API manager module 526 uses N3-files 530 (which contains triples in the N3 format) for searching the method implementation 528, wherein "api:Method" ontology (for example) lists all methods, arguments types and return values.

The following N-Triples text have three RDF statements:

```
1. <http://www.w3.org/2001/sw/RDFCore/ntriples/>
<http://purl.org/dc/elements/1.1/creator> "Dave Beckett" .
2. "<http://www.w3.org/2001/sw/RDFCore/ntriples/>
<http://purl.org/dc/elements/1.1/creator> "Art Barstow" ".
3. "<http://www.w3.org/2001/sw/RDFCore/ntriples/>
<http://purl.org/dc/elements/1.1/publisher> <http://www.w3.org/>".
which represents the following RDF/XML:
<rdf:RDF xmlns:rdf="http://www.w3.org/1999/02/22-rdf-syntax-ns#"
    xmlns:dc="http://purl.org/dc/elements/1.1/">
  <rdf:Description rdf:about="http://www.w3.org/2001/sw/RDFCore/
  ntriples/">
    <dc:creator>Art Barstow</dc:creator>
    <dc:creator>Dave Beckett</dc:creator>
    <dc:publisher rdf:resource="http://www.w3.org/"/>
  </rdf:Description>
</rdf:RDF>.
```

Implementation of the method is a program code, which executes the business function. For example, it can save the data to a Database, or can close or open the task and other operations.

For example, a "CreateTask" API method is used for the task creation. The method accepts tasks data as an argument and returns the identifier for the created task. The JSON-handler gets the method name and arguments (a task data) in the JSON-format when the method is invoked via JSON-protocol. Then arguments are converted to an internal representation of data in the memory, and transmits them to the API manager. The API manager (which has a list of methods) can find the required "CreateTask" method by name. Then, the API manager validates arguments (the number and type of) and implements a method "CreateTask". After the task was created by the "CreateTask" method, the API manager transfers back the result to the JSON-handler. The JSON-handler converts the result to the JSON format and sends it back to the client (for example, to the MS Outlook client or to a mobile device application).

API Manager loads the API specification and extension modules from the Database during the application start (MS Outlook plug-in 507). This specification can be requested by the Outlook plug-in 507 of MS Outlook client 506 or through a special Ajax-request or as a scheme in the WSDL-format with using a SOAP-protocol. Note that the MS Outlook is synchronized with the MS Exchange Server 402.

A Web Client 502 (for example, based on JavaScript, or on HTML5) or the Command Line Client 504 can be used instead of MS Outlook. Console client is the client application, which can call API methods using command line. Also, a mobile application on a mobile device 502 can be used.

Javascript client is the client application, which is executed in the user web-browser and which can call API methods using JavaScript language.

Outlook Add-in (Outlook client) is the client application, which is executed in the MS-Outlook application which can call API methods with using WCF-protocol.

The Web Services Description Language (WSDL) is an XML-based interface description language that is used for describing the functionality offered by a web service. A WSDL description of a web service (also referred to as a WSDL file) provides a machine-readable description of how the service can be called, what parameters it expects, and what data structures it returns. It thus serves a purpose that corresponds roughly to that of a method signature in a programming language.

Next, the client applications (502, 504, 506) can make calls using Ajax-query reporting format JSON, or SOAP protocol.

The main stages of processing the request:

1. Incoming request is processed by the HTTP-server (or by the External server, or MS Exchange Server). JSON serialization or SOAP converting to internal formal will occur.

2. API manager 526 receives the input data and validates the input arguments to match the method description.

3. API Manager 526 loads and prepare required data model and create the snapshot of the model for the isolation from the other requests and operations. The write transaction is opened if the operation will change the model data.

4. Call the programming code (or rules with ontologies and Comindware® language) which execute the method.

5. The transaction will be closed if the operation is a modifying operation, and checking for changes to security, the conflict detection, the update transaction history will be done.

6. The result is serialized in the format required by customer and given to HTTP-response.

The business logic of the application 520 implements an object layer over the facts storage. Access to data is provided through the client API, which contains methods for the objects reading/writing if objects, objects templates, business rules. Calls of the API methods by clients are implemented through the sessions, which are created after the client authorization. This layer contains a number of system ontologies, such as, for example, "the template of the user object" or "business-rule". Ontologies are used in API for data serialization and validation.

The data storage 542 provides the physical storage of the model data on the hard disk drive. The data is sent to the data storage 542 and back out in the form of the facts (triplets). A fact is a triple, which is stored in the model. Also, the fact can be obtained by applying the rules or requests. A data storage consist from:

triplets streaming store 558 allows to record and query triplets of special file format. Streaming store triplets supports multiple types of queries on various components;

The transaction and snapshots manager 554 allows to create:

a. transactions. Transactions are the objects with the interface for atomic modification of the storage triplets. The model changing is possible only within the framework of such a transaction while guaranteeing atomicity modification store triplets (commit all changes made within a transaction, or none of them);

b. snapshots. Snapshots are objects with an interface for consistent read from the triplet storage. It is guaranteed that none of the transactions (which were committed during the existence of the snapshot) will affect its contents.

Triplets stored in the repository are simple, small objects (numbers, strings, names). The binary stream manager 556 is used to save large values (files, data streams) on the storage. The stream is stored in a separate file, and a link to the stream is stored to this file;

The data storage model 550 represents a set of interfaces for managing data storage. Such interfaces can include transactions, snapshots, the interface for requesting the facts (triples) from the snapshot and interface for writing the facts to the transaction.

The semantic processor 540 contains a description of interfaces, such as the name, the facts (triplets) and the model rule.

The N3-converter 549 allows to generate a data model based on the content of N3-file 530. (Note the triples can be stored in the database in any format discussed above.) A connection to the data store is another method of forming a pattern. Furthermore, the combined models can be formed, so multiple models are combined into one. Requests for such models lead to a request to the facts of each connected model. Recording while still being only to one of the models.

A business rules handler 544 is an optional add-on over the data model. After handler 544 is connected with the model, it allows to compute derivatives based on existing facts and rules there.

The Data Model Interface 546 is a set of interfaces for requesting facts from the model, for writing to the model, transactions and model snapshots creating.

The Ontologies Serializer 548 creates the queries to retrieve objects from the entire model based on the ontologies (description of the structure of objects stored in the model).

Transactions and queries are isolated using transactions. After a transaction is opened for writing or reading, the transaction is completely isolated from other transactions. Any changes in the data model made by other transactions are not reflected. Conflicts detection and resolution of conflicts are performed when closing the transaction, which was opened for writing. The so-called model optimistic concurrency is used. Detection of conflict occurs at the level of individual semantic facts. A conflict occurs when the fact has been modified by two transactions since the snapshot model was created and until the closing of the transaction. An exception will be generated during the conflict determining. In this case the user can to try update the saved changes and try again to commit changes.

Optimistic concurrency control (OCC) is a concurrency control method for relational database management systems that assumes that multiple transactions can complete without affecting each other and that therefore transactions can proceed without locking the data resources that they affect. Before committing, each transaction verifies that no other transaction has modified its data. If the check reveals conflicting modifications, the committing transaction rolls back. OCC is generally used in environments with low data contention. When conflicts are rare, transactions can complete without the expense of managing locks and without having transactions wait for other transactions' locks to clear, leading to higher throughput than other concurrency control methods. However, if conflicts happen often, the cost of repeatedly restarting transactions hurts performance significantly; other concurrency control methods have better performance under these conditions.

More specifically, OCC transactions involve these phases:

Begin: Record a timestamp marking the transaction's beginning.

Modify: Read database values, and tentatively write changes.

Validate: Check whether other transactions have modified data that this transaction has used (read or written). This includes transactions that completed after this transaction's start time, and optionally, transactions that are still active at validation time.

Commit/Rollback: If there is no conflict, make all changes take effect. If there is a conflict, resolve it, typically by aborting the transaction, although other resolution schemes are possible. Care must be taken to avoid a TOCTTOU (Time-Of-Check-To-Time-Of-Use) bug, particularly if this phase and the previous one are not performed as a single atomic operation, see also discussion of the conflict resolving mechanisms between transactions, i.e., transactions not affecting each other, discussed above.

Figure 6:
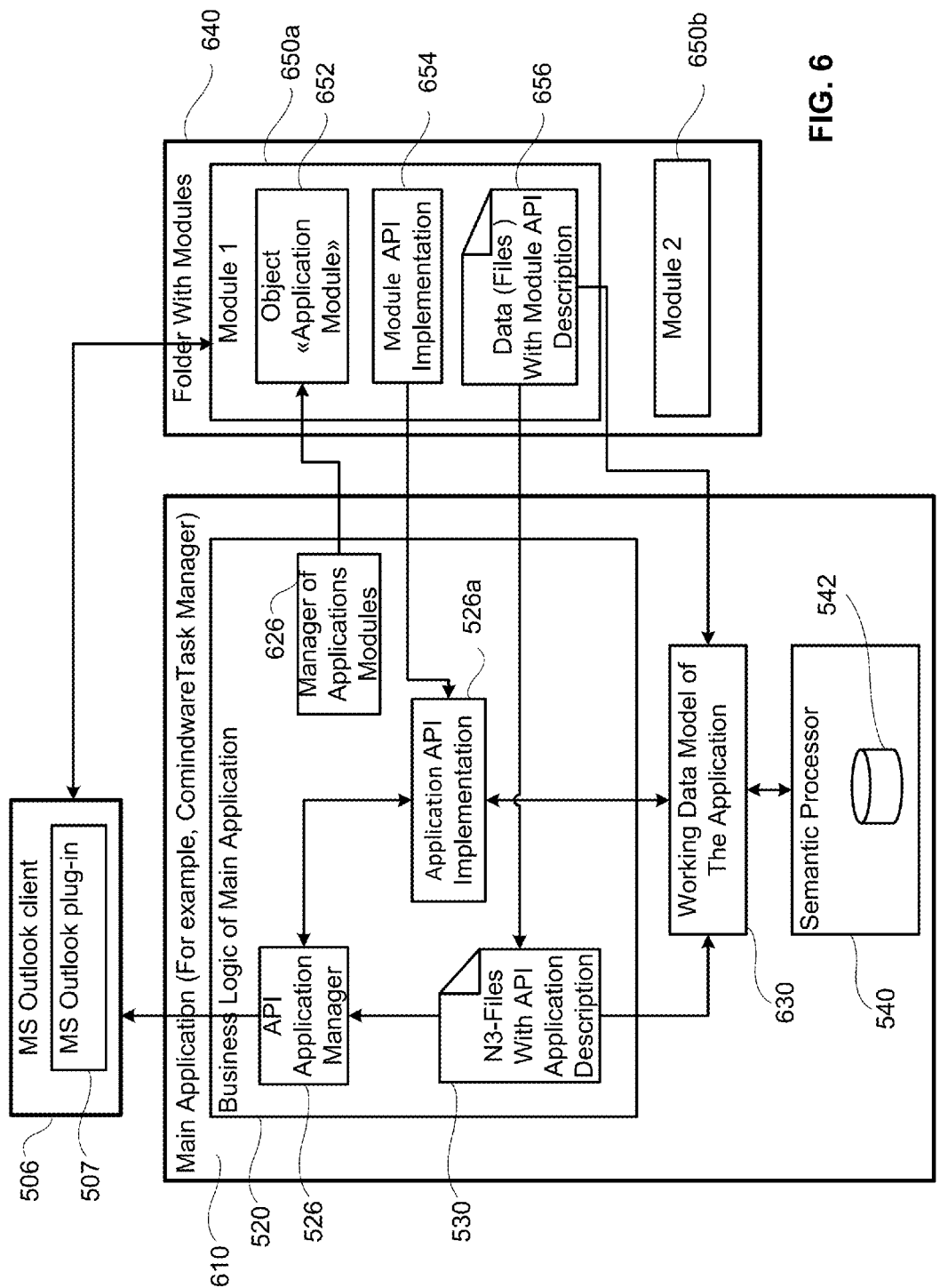
FIG. 6 illustrates the modular architecture of the application, in accordance with the exemplary embodiment.

FIG. 6 illustrates a modular architecture of the application for the invention. The application 610 (such as Comindware Process, Comindware Task Tracker, Comindware Project, etc.) is built in such a way that its functionality can be extended by downloading and installing of new modules. The Modules 650a, 650b, etc. (for example, Module 1) can be represented as:

a binary file in the ".dll"-format with module API implementation 654;

a set of files in N3 format 656 that contains Module API description.

The manager of applications modules 626 during the initialization process scans (views) a folder 640 with the installed modules.

Note the modules can include: Comindware Project for project management; CRM, ERP, IT help desk or any other system. The user can use the lists synchronization of leads with the Salesforce system so the user can seamlessly add process management and workflow automation capabilities into SFDC CRM environment. It can also automatically trigger a custom survey in such systems as SurveyGizmo, whenever a process requires this step. Once the survey is completed, the results are immediately transferred back to appropriate business processes in the Comindware Tracker system.

Regardless of the project plan, tasks are frequently finished either far ahead of schedule, or past due date. In this case, the Comindware Gantt-chart (as a part of Comindware Project) automatically reschedules the remainder of the work, so that the overall plan constantly remains up-to-date and shows the real status of your project—as well as actual estimated milestones and finish date. So it is not necessary to fill in misleading percentages of task completion or unrealistic due dates. Comindware Project can determine achievable deadlines by tracking the real task progress, based on estimated time minus logged time. Baselines can be used to make snapshots of the project plan as it was at a particular date. This way, it is possibly to view how the project plan is changing in time and make appropriate corrections. Task Deadline Alerts can be used to be instantly updated if tasks are behind their schedule and thus need the attention. Tasks that are overdue will be highlighted on the Gantt chart. Automated Priority-based planning can be used for schedule projects by assigning tasks and defining priorities through a simple drag-and-drop interface. The project plan will be calculated automatically. There is no need to do resource leveling, manual task linking, and numeric priorities.

The manager of application modules provides an access interface to modules. This module loads all library files (*.dll) from the folders with the modules at the start of the application. The module asks each module for metadata, module name, version, and application version requirements. All modules available for loading are initialized, so initialization methods (which are implemented in the extension) will be called.

The "application module" 652 entity implements the interface for providing module metadata to the application: the module name, the version, and application version requirements.

The result is a working data model 630 of the application.

The API manager loads API description and modules from the system ontology storage during the start of the application. Such description can be provided to the client application by an Ajax-request or as a schema in the WSDL-format with using the SOAP-protocol. The client applications can make calls using Ajax-query in the JSON-format, either through SOAP-protocol. The main stages of the requests processing:

An incoming request is processed by HTTP-server (or can be processed by the External server, or by the Microsoft Outlook client, or the MS Exchange Server). JSON serialization occurs or the SOAP representation into the internal format occurs;

API Manager accepts input data and performs a validation on incoming arguments match the description of the method. At this stage, the original security check occurs on the line calling user specified requirements;

API Manager loads and prepares the required data model, and creates a snapshot of the model to isolate it from other queries and transactions. The opening transaction for the writing occurs in the case of an operation that changes the contents of a model;

The code of method is invoked.

The transaction is closed if the case of modifying operation, and checking for changes, the conflict detection and updating the transaction history are started.

The result is serialized into the format needed by the clients and sent in the form of the response (for example, in the form of the HTTP-response).

Figure 7:
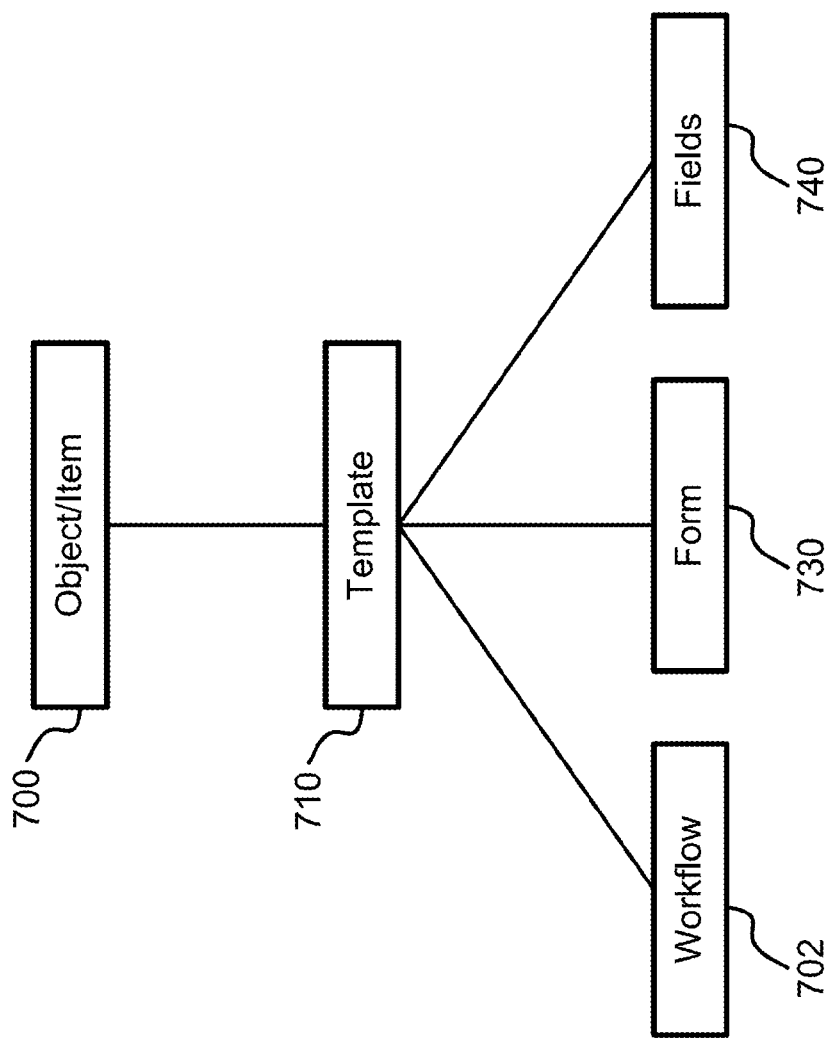
FIG. 7 illustrates the relationship between the objects and its constituent parts, in accordance with the exemplary embodiment.

The FIG. 7 illustrates the relationship between the objects and its constituent parts. The object (Custom Object or Outlook item) 700 has its own template 710. The template 710 can contain template name and other fields (i.e., for example, field "department" defines a department that hires a new employee. In this example, the department is a software development department. A field "work experience" can display a number of years required for this position. For example, the experience can be more than twelve years. Other fields in this example have no rules. Note that an arbitrary set of rules can be used depending on an object.). For example, in a bug fixing process, the bugs have properties contained in the template. A state can be one of the template fields.

According to the exemplary embodiment, the template 710 has the workflow 202, a form 730 and fields 740. The form 730 is used for displaying (within GUI) data collected from the fields 740, the item 700 and from the task template. The fields 740 are displayed in order. The items 700 and tasks can be stored in item groups. Each item group can have its own template with special properties.

Each task has a title that is derived from an item name and a state name (also auto-generated tasks can be used). The state contains task assignment data defined by the workflow. Additionally, the task can contain object description and comments. Note that some task fields are auto-generated and some fields can be modified by the task assignee. According to the exemplary embodiment, the task can have parent property that contains a link to a parent Custom Object that owns the task. Thus, the tasks with the same links to the parent Custom Object belong to the same. A user can view all tasks for the parent Custom Object by using the link. As discussed above, an Item is an instance of Object. Thus, Outlook Item is an Object for purposes of this invention, which can be converted into a format understood by MICROSOFT OUTLOOK. Item can be an application Item, i.e., Item is an Object if applied to an application.

Custom Object transition through the workflow can generate tasks (auto-generated tasks) at required steps (states) and assign them to certain users.

The workflow begins from an initial state defining an object. Then, the workflow moves to the next state. Subsequently, the process checks whether the workflow has reached a final state. If the state is final, the workflow stops. The initial and the final states are explicitly set prior to workflow configuration.

If the state is not final, the process moves to the next step, where it checks whether the task generation is required. If the task generation is required, the task is automatically generated. After the task is generated, the process moves to the next step. If the task generation is not required, the process moves to another step.

If a transition to the next state is selected, the process moves to an optional step. If the task is closed by its assignee and a transition to the next state is selected, the process moves to an optional step, where the process checks conditions of the task closing or state transition. A requirement for task generation is incorporated into the workflow for each state that needs a task to be generated.

Note that transition to the next state can be implemented by one of the methods: a task is closed by its assignee; a task is closed automatically by selecting a next state option; and a task is closed and transition to the next state is selected.

Each task can have at least one sub-task. The sub-tasks are created manually or automatically. In order to close the task, all the sub-tasks have to be closed. A sub-task can be created, if the entire task cannot be executed for some reason. For example, a bug cannot be fixed unless it is reviewed by a lead software developer. In this case, a sub-task is created for the lead software developer. Thus, the task cannot be closed until the lead software developer closes his sub-task.

Figure 8:
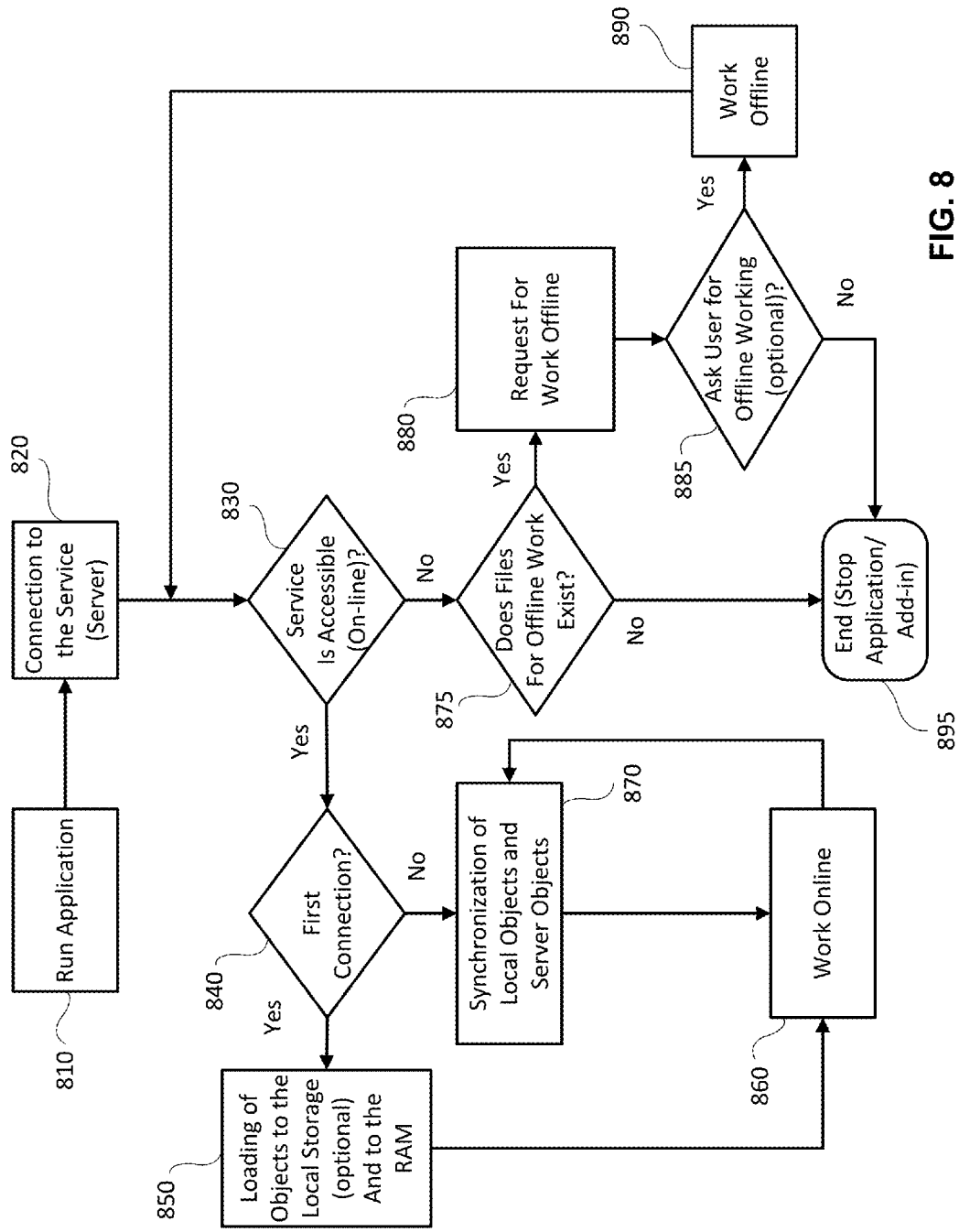
FIG. 8 illustrates a chart for synchronizing Custom Objects between MS Outlook and an External server in on-line and off-line modes, in accordance with the exemplary embodiment.

According to the exemplary embodiment, workflow-related data, template data, object fields, tasks and other service data can be stored in a database in a form of triples (or in another format FIG. 8 illustrates a chart for synchronizing Custom Objects between MS Outlook and an External server in on-line and off-line modes, in accordance with the exemplary embodiment.

The application is run in step 810. In step 820 the connection with the External server (or an external service, such as Hotmail, Windows Live SkyDrive, Windows Live Web Messenger, and so on) is established and the process goes to step 830, wherein the External server is checked for availability. If the External server is available for the connection in step 830, the process goes to step 840, else the process goes to step 875.

In step 840 is checked whether the current connection is the first connection to the External server. If it is a first connection to the External server the process goes to step 850. In step 850 Custom Objects are downloaded from the External server to the local storage (where the MS Outlook client is installed) and to the RAM, and the process goes to step 860.

The download of the Custom Objects is an optional step and only metadata and service information is downloaded from the External server. Note the metadata and the service information can include the headers of Custom Objects (to display them as a list in the objects window, for example), can include information about objects states, about size of the attachment, can include information about current session with External server, the version of the External server, data for transferring data between External server and MS Outlook client and MS Exchange server, data with location of stored data, date of the last connection, data of last updates, commits, object creation and deletion, and other necessary information for the External server and MS Outlook interaction.

If it is determined that this is not the first connection in step 840, the process goes to step 870, where the synchronization module performs the synchronization of locally stored Custom Objects and objects stored on the External server. In other words, actual data is downloaded from the External server to the local data storage, and data is uploaded to the External server if the data on the External server is older than the data on the local data storage. Further the process goes to step 860, wherein Custom Objects can be managed by the user. The process continuously checks for up-to-date data on the local storage and on the External server and synchronizes them with each other.

In step 860 Custom Objects and Outlook Items can be managed (converted, viewed, edited, saved, etc.).

If, in step 830, the External server is not accessible, the process goes to step 875, where the process checks if the files for off-line work are exist. If the answer is no, the process ends in step 895. If files for off-line work are present on the local data storage the process goes to step 880, where the request for off-line work is addressed to the application. Further the process goes to step 885 and the user is asked to work off-line. If the user doesn't want to run application off-line, the process goes to step 895. If a user wants to run an application (e.g., MS Outlook client) off-line, the process goes to step 890, where the user can manage Custom Objects and Outlook Items. If the connection is restored with the External server, the process goes to step 840 (after the checking in step 830).

Figure 9:
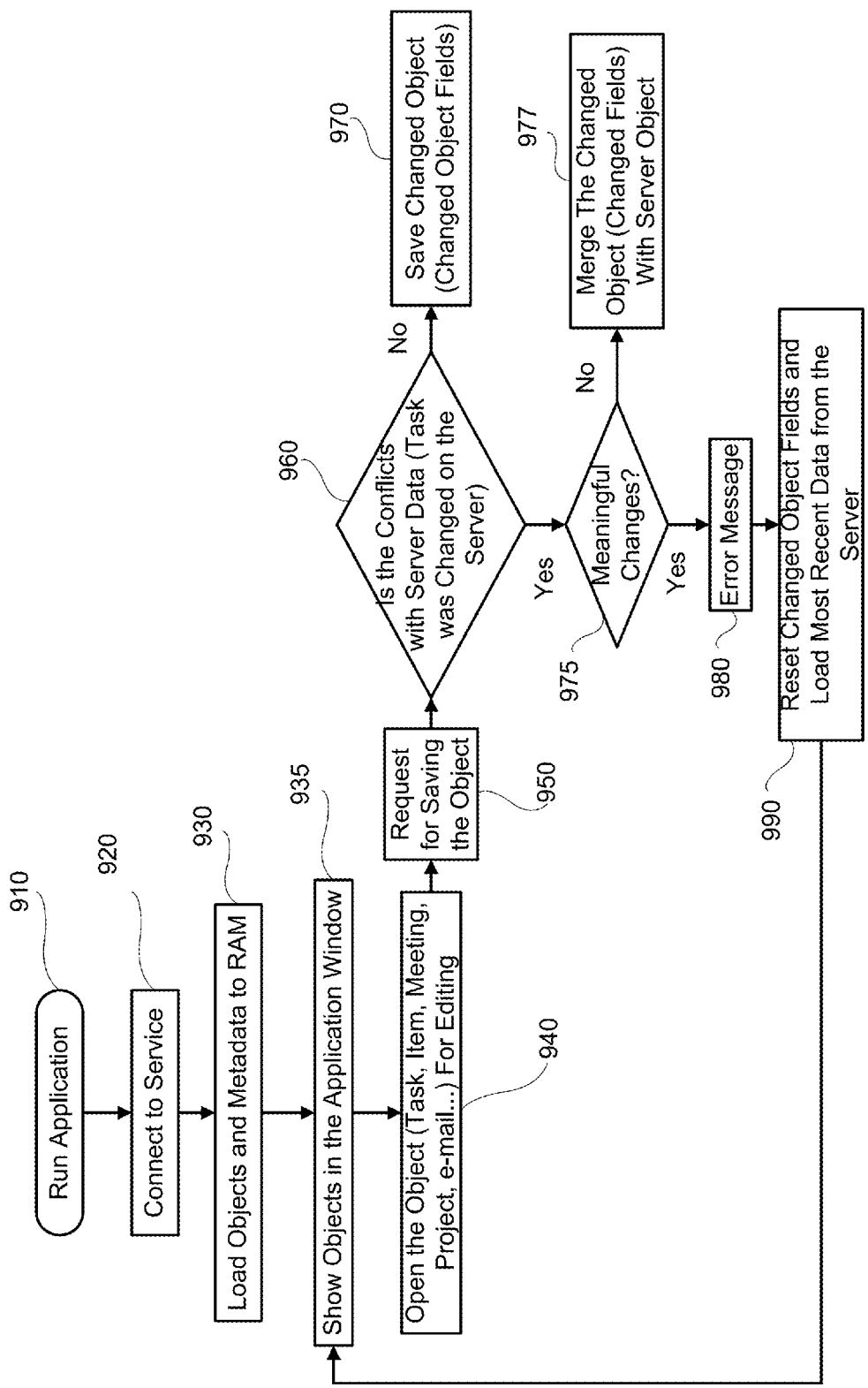
FIG. 9 illustrates a chart for synchronizing Custom Objects between MS Outlook and an External server in the on-line mode, in accordance with the exemplary embodiment.

FIG. 9 illustrates a chart for synchronizing Custom Objects between MS Outlook and the External server in an on-line mode, in accordance with the exemplary embodiment. The process start in step 910, wherein the application (for example, a plug-in for Outlook, or a standalone application, such as COMINDWARE® Process, COMINDWARE® Task Manager, COMINDWARE® Tracker and others).

COMINDWARE® Process, COMINDWARE® Tracker and COMINDWARE® Task Manager are applications for the task management. Such applications can be used to visually design process workflows with drag-and-drop simplicity through the graphical Workflow Builder. There is no coding required. Processes can be easily shared across teams and departments, or scheduled as recurring workflows. Any changes can be applied to existing processes, whether it is an additional step, a new assignee, all within the same user interface. All modifications are made in real-time with the use of graphical Workflow (shown on FIG. 10, FIG. 11) and Form Builders. The Workflow Engine can be used for start building any process and incorporate additional components after the start working with the workflow and the process, so processes are deployed step by step.

The user can manage personal to-do lists along with team tasks. Comindware Tracker lets the user manually create and assign individual tasks when needed, as well as automatically generate workflow tasks with pre-defined due dates and priorities. The user can create and manage an unlimited hierarchy of sub-tasks. The user can also schedule recurring tasks to be created automatically, or easily reassign tasks when required. User can track time spent and any changes made to a task, by whom, and when. Comindware Tracker provides a full change history on each task. Automated notifications and adding other followers is provided. The user can create rules to validate and automatically modify form fields depending on a workflow step or form data. Comindware Tracker lets users involve appropriate team members into a process, allow or deny a certain transition, or calculate field values using Comindware Expression language.

Figure 10:
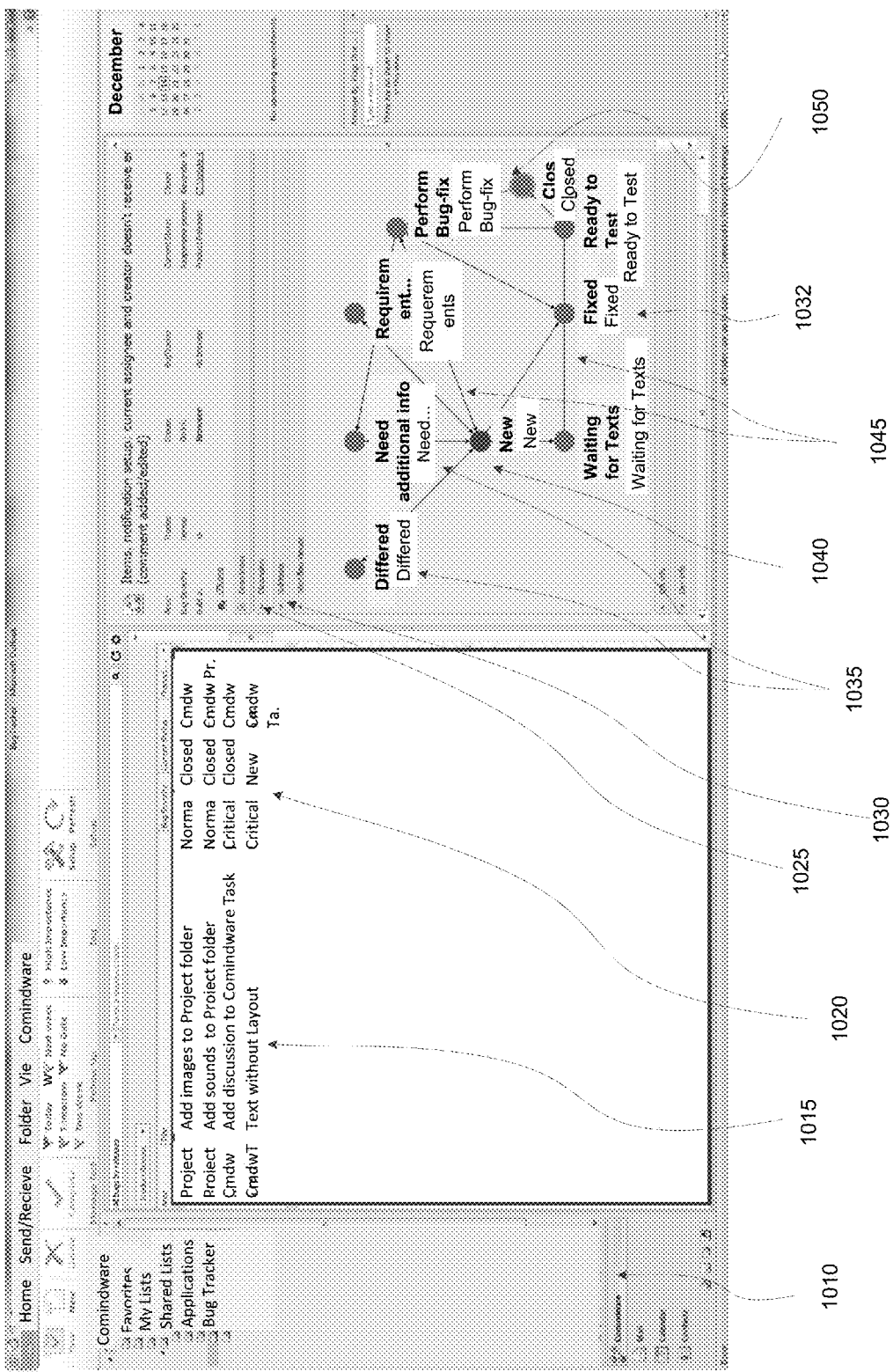
FIG. 10 illustrates the main view of the MS Outlook plug-in, in accordance with the exemplary embodiment.

In step 920 the process connects to the External server (or the cloud services, for example, as discussed above) and the process goes to step 930, where process, objects are downloaded from the External server to the local storage, same as an in step 850 (FIG. 8) and the Custom Objects are shown in the application window in step 935 (for example, custom tasks in FIG. 10). The user can open the Custom Object for managing (viewing, editing, moving, converting, assigning and other actions) in step 940. After the Custom Object is changed by the user the Custom Object can be saved, so request for saving the object will sent to the External server in step 950. If the External server is not accessible (off-line), then the changed Custom Object data can be stored locally on the local storage (synchronized data storage), and the saved data will be transferred to the External Server when it becomes accessible for the plug-in (application).

In step 960, conflict detections are traced. If the conflict (for example current Custom Object was changed and stored on the External server by another user, or by the system, or changed to previous version, or was changed on the External server indirectly when the linked parent object was changed) is not detected in step 960, the process goes to step 970, and changed data (changed fields of Custom Objects or Outlook Items, or Custom Objects entirely) will be transferred to the External server and stored. If the conflict is detected in step 960 the process goes to step 975, and the significance of the changes are checked. If the changes are not meaningful for the object (adding texts to existing comments, adding new comments, attaching new documents, creation new workflow states, so there is no loss in the workflow and in the process) and the object integrity is not broken, then changes can be merged with the object(s) stored on the External server.

If the changes are meaningful for the object (changes of the workflow state, tasks status, states deletion, links with internal objects are changed, so the structure of the Custom Object is changed and previously stored data can be used with new data) changes can't be merged with currently stored on the External server objects, and an error message will be shown in step 980. The process goes to step 990 where the changes (which was made to currently opened for editing Custom Object) will be reset and last data (fields of Custom Objects) will be shown to the user (for example in the MS Outlook plug-in) or copied from the External server to the local data storage in case of the cooperative on-line and off-line working so the actual data will be represented to user as Custom Object.

A Custom Object on the External server can be replaced by an opened for the editing Custom Object if such settings are set up. For example, Custom Objects on the External server can be replaced by the new data, for example, depending of the position of the employee, so data from the department director are valuable then the data from the marketing intern. In this case, the window of the previously stored data (on the External server) and currently edited data can be shown, so differences between two Custom Objects can be shown. The user can choose to save (replace the External server object with the current Custom Object) or cancel the changes.

After the merging or cancelling of the changes, the process goes to step 940, where actual data of the Custom Objects are shown to the user.

FIG. 10 illustrates the main view of the MS Outlook plug-in. The Comindware plug-in can be used by the opening the inset 1010, which is the entry for the plug-in main window. The inset 1010 is similar to the standard inset of MS Outlook such as "Mail", "Calendar", "Contacts" and others. Custom tasks 1015 (Custom Objects, states of Custom Objects, states of the workflow) are shown in the internal window of Custom Objects view. The task status 1020 also can be shown for the tasks 1015. Task attributes, such as bug severity, which project task belongs, etc., can be also shown. The discussion 1025, Subtasks 1030, Workflow viewer, Development info, and other managing tools linked with the objects can be shown in the other inner window. The workflow and workflow states 1035 of the Custom Objects can be shown in the opened tool "Workflow viewer" 1032. Each tool can be opened to view more details for currently chosen Custom Object (when the one of the Custom Objects is chosen).

One of the workflow states also is a start state 1040 of the workflow. Links 1045 are the transitions from the one state of the workflow (states of the state machine). Also note that one state can has one or more output transitions and input transitions. One of the workflow states also is a finish state (end state) 1050. In this case, this state is a current state (highlighted by the ring).

Figure 11:
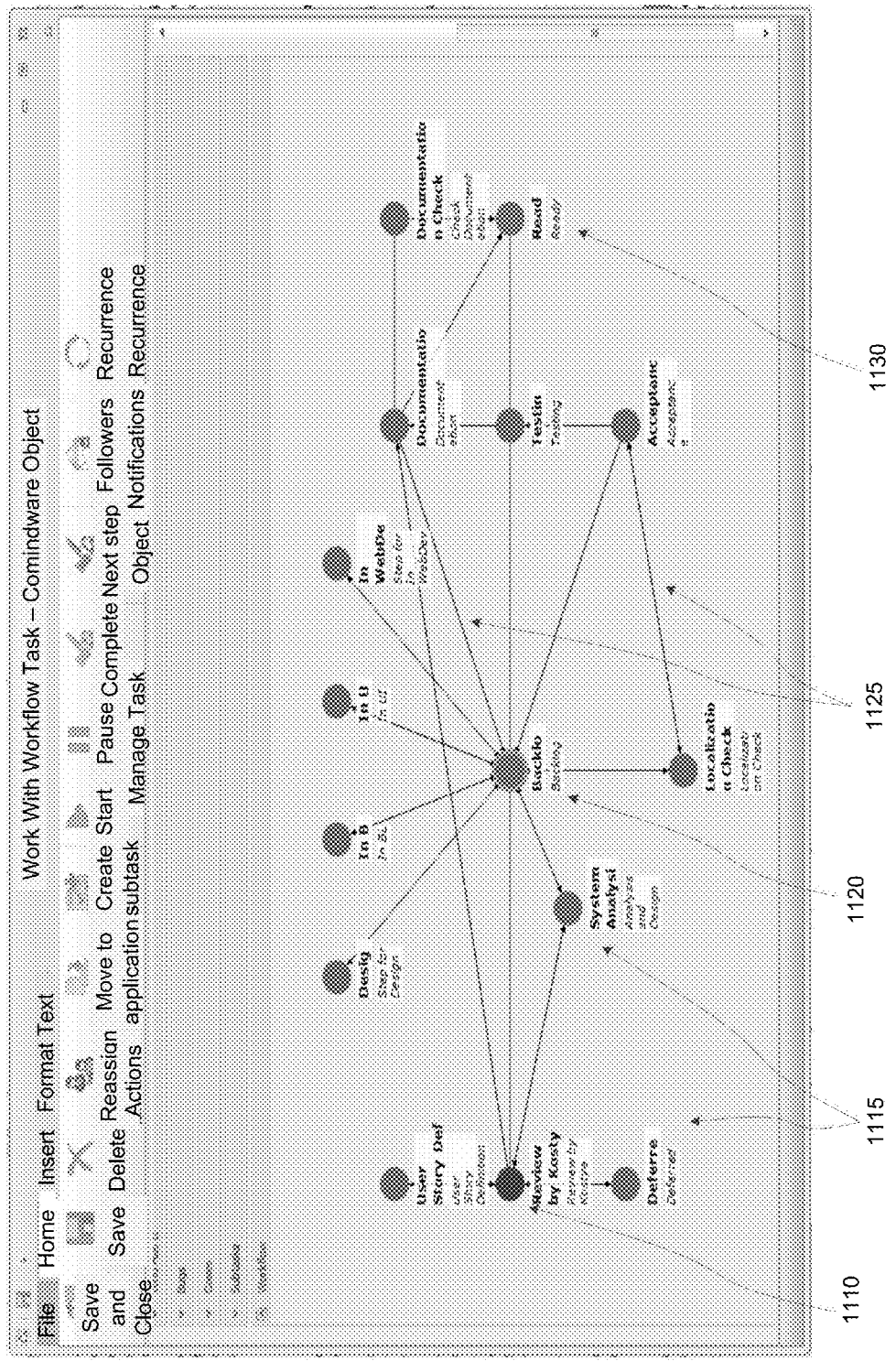
FIG. 11 illustrates a screenshot of the Workflow (inside the Workflow view), in accordance with the exemplary embodiment.

FIG. 11 illustrates a screenshot of the Workflow (inside the Workflow view). The state 1110 is the start state of the workflow (the start state of the state machine). States 1115 are states of the workflow. The state 1120 is the current state of the workflow. Links 1125 (transitions) are bidirectional transitions. Note transitions can be a unidirectional or bidirectional. The state 1130 is the end of the workflow in this case.

Figure 12:
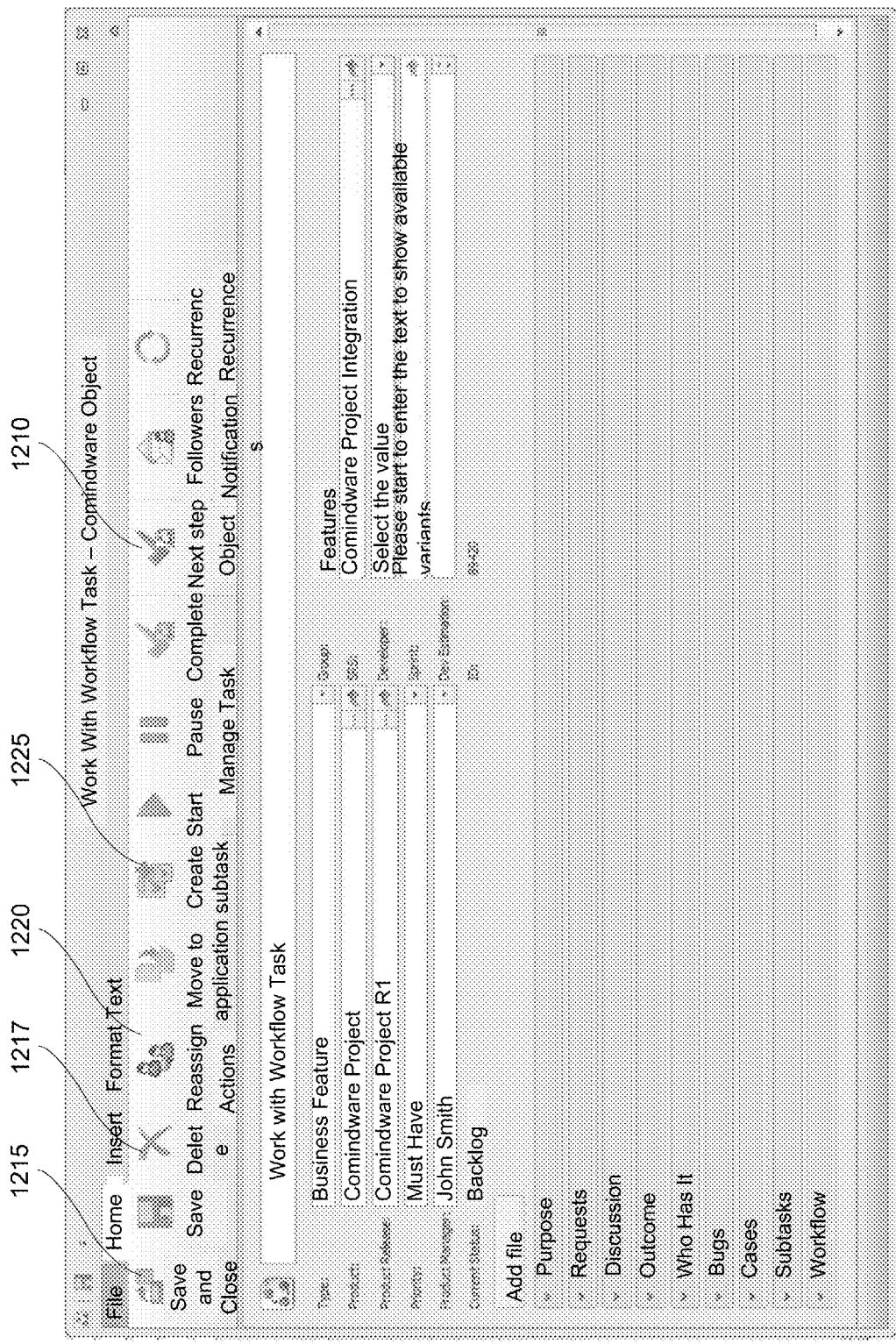
FIG. 12 illustrates the workflow task opened for editing or creation, in accordance with the exemplary embodiment.

FIG. 12 illustrates the workflow task opened for editing or creation. Each parameter (the Type, the Product, the Manager, the Developer, etc.) can be adjusted or filled in the accordance with the wishes of the user (manager, bug fixer, developer, manager, director, etc.). Some fields of the Custom Object can be filled automatically by the process, for example, some fields can be filled by the values of the previous state of the workflow, or based on the business rules, transition rules, or can be calculated based on the information from the Custom Objects and links with other Custom Objects, e-mails, Outlook Items, calendar, meeting time, preferences, collected statistics, or from the external or internal databases (for example database with the candidate list, employee status, department necessaries, and other). Also, files and documents can be attached to the task. Also links with linked with current task can be shown in the "Who Has It" inset. The Next step 1210 of the workflow can be chosen, so the process will go to the selected step A. Task can be Saved and closed 1215, Deleted 1217. A subtasks 1225 can be created, and the actions can be done for the Custom Objects and tasks.

Figure 13:
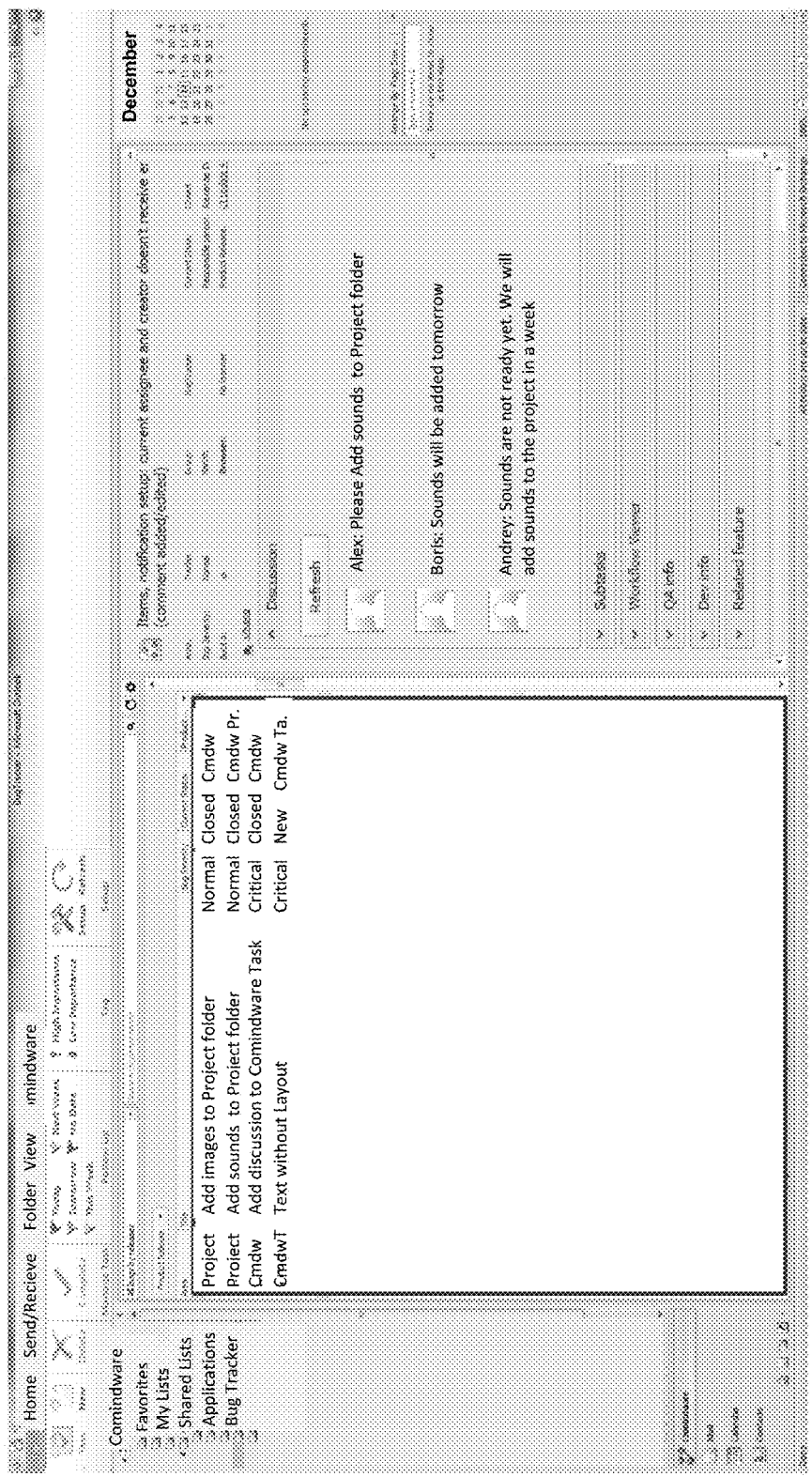
FIG. 13 illustrates a screenshot of discussion (user comments interface), in accordance with the exemplary embodiment.
Figure 14:
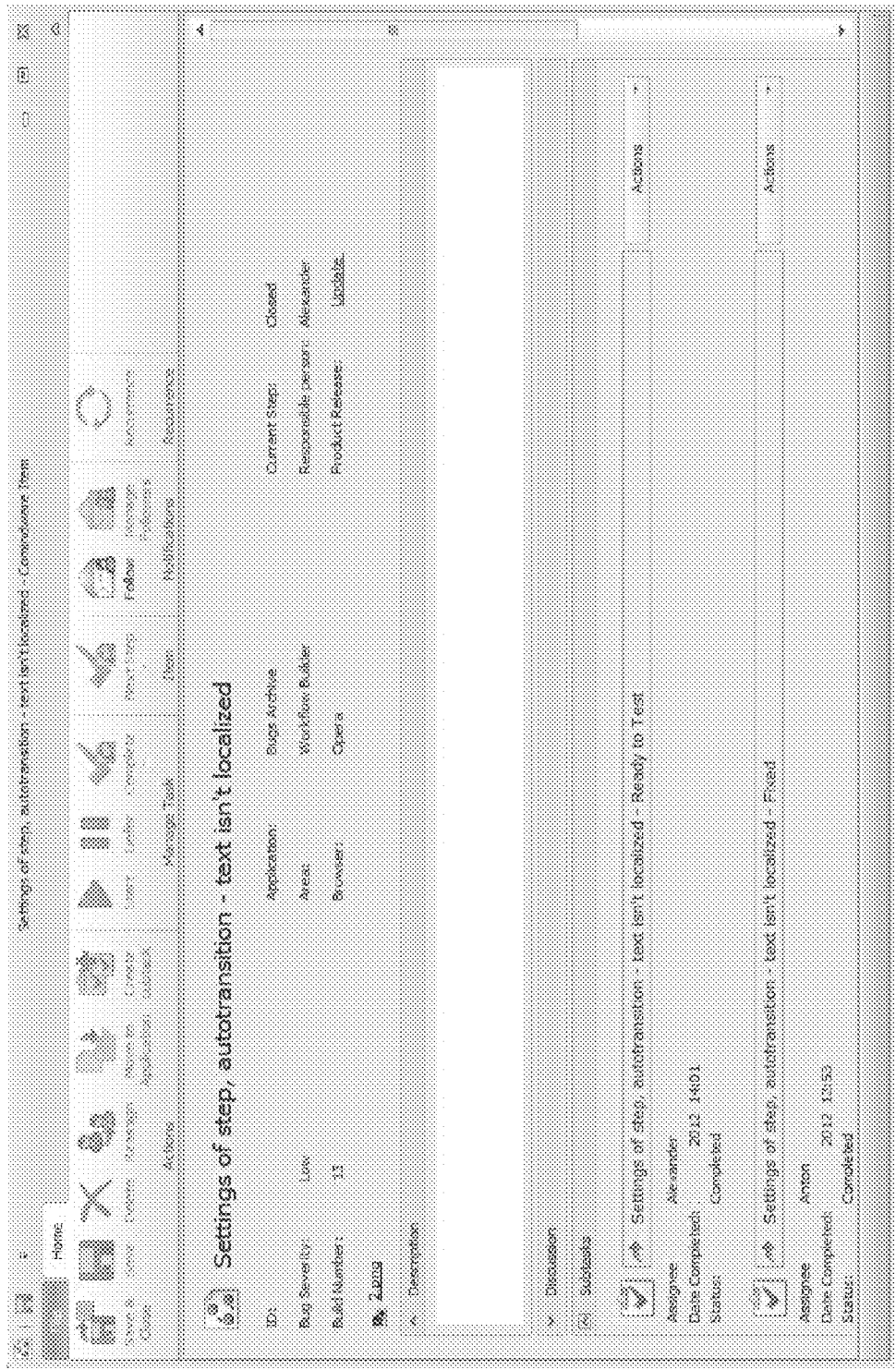
FIG. 14 illustrates a screenshot of a subtask interface, in accordance with the exemplary embodiment.
Figure 15:
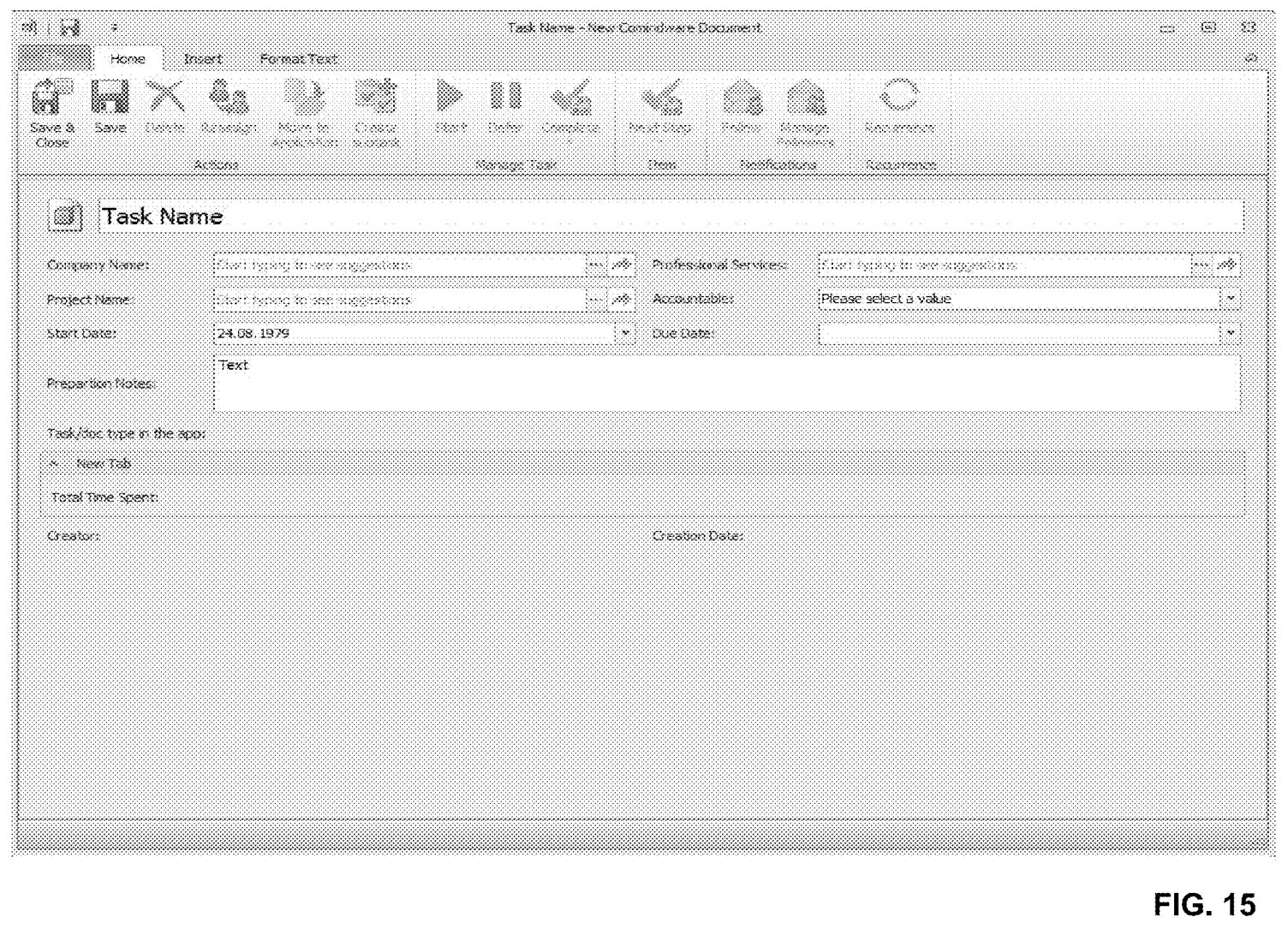

FIG. 13 illustrates a screenshot of discussion (user comments interface), in accordance with the exemplary embodiment. FIG. 14 illustrates a screenshot of subtasks interface, in accordance with the exemplary embodiment. FIG. 15 illustrates a screenshot of a task creation interface, in accordance with the exemplary embodiment.

Those skilled in the art will appreciate that the proposed method and system provide for an effective two-way synchronization between MICROSOFT Outlook and an External server.

Two-way synchronization is required, since users can also work with Custom Objects with other interfaces, implemented as plugins for other software (i.e. MICROSOFT Visual Studio). The External server also provides its own web interface, and users can work with Custom Objects using it.

Figure 16:
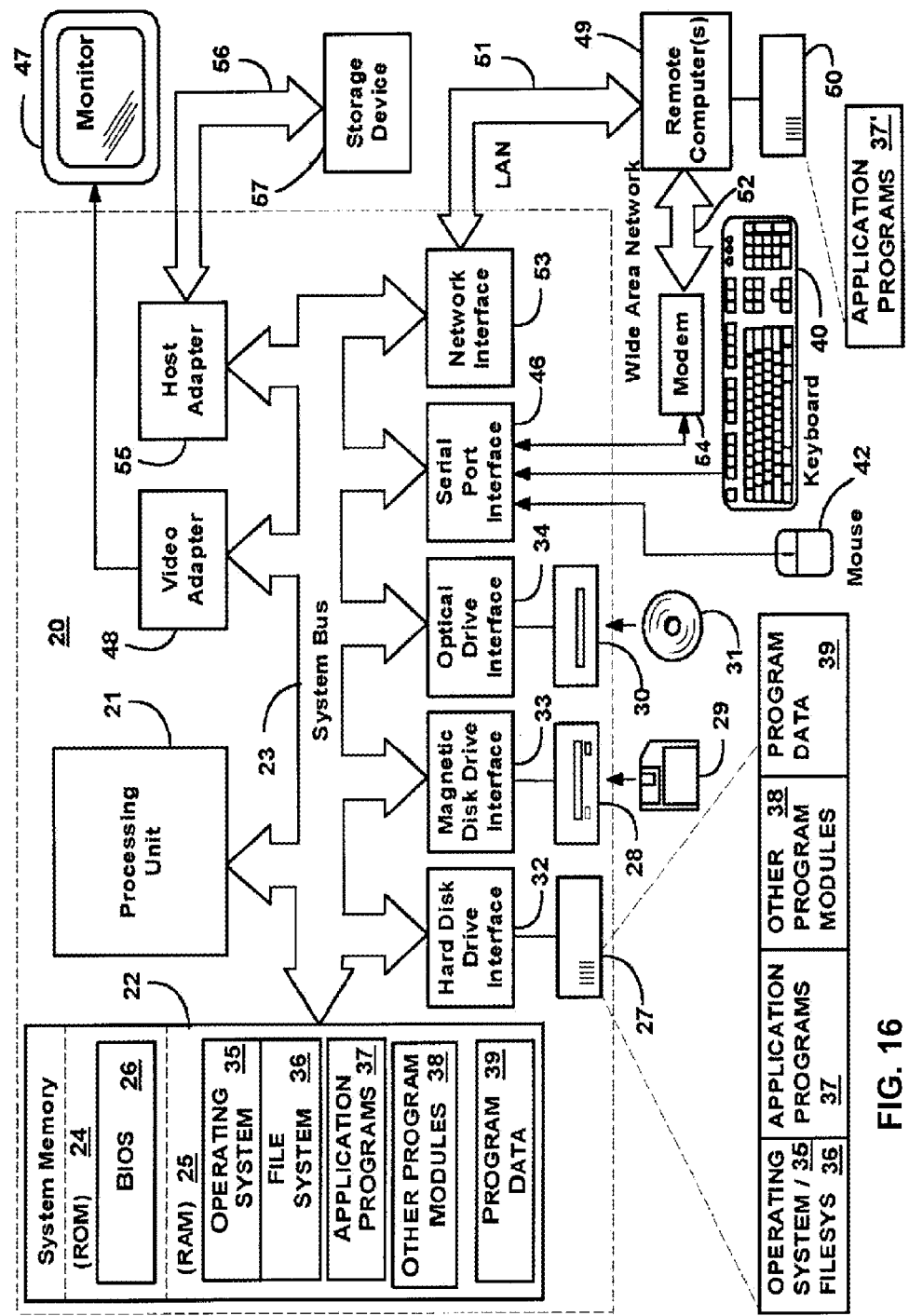
FIG. 16 illustrates a schematic of an exemplary computer system that can be used for implementation of the invention.

With reference to FIG. 16, an exemplary system for implementing the invention includes a general purpose computing device in the form of a computer 20 or a server, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented system for synchronizing Custom Objects between an application and an External server, the system comprising:
    the application interfacing to a first server for synchronizing standard objects supported by the application;
    a plurality of Custom Objects stored on the External server, wherein the Custom Objects are not supported by the application, the application interfacing to the External server for synchronizing Custom Objects, wherein the first server and the External server are separately located;
    the application storing a plurality of standard objects,
    wherein the application includes a Custom Object manager for managing the Custom Objects and for synchronizing the Custom Objects with the External server,
    wherein the External server synchronizes the Custom Objects across multiple clients,
    wherein the standard objects are converted to Custom Object types supported by the Custom Object manager, wherein the application synchronizes only the modified fields of the Custom Objects with the External Server, wherein at least one of the Custom Object type includes a workflow that represents a structured sequence of actions, and wherein the Custom Objects include a hierarchy of comments that includes comments posted in reply to other comments or as an addition to a discussion.

2. The system of claim 1, wherein the Custom Object manager manages the workflow of at least one of the Custom Object types.

3. The system of claim 2, wherein managing the Custom Object includes any of editing properties of the Custom Object, task management, deleting and editing data of fields of the Custom Object, and editing the Custom Object workflow.

4. The system of claim 1, wherein the Custom Objects are configurable for multiple Custom Sub-Objects for each Custom Object, and a structured reference to other Custom Objects.

5. The system of claim 1, wherein the Custom Object changes are stored on the local storage if the External Server is not accessible.

6. The system of claim 5, wherein the Custom Objects from the local data storage are synchronized with the External Server's Custom Objects after a connection is established to the External Server.

7. The system of claim 5, further comprising the local data storage for storing the Custom Object data for the last synchronization with the External Server.

8. The system of claim 5, wherein only the changed part of a Custom Object is synchronized with the External Server.

9. The system of claim 1, further comprising a change events listener module for detecting changes in the Custom Objects and application standard objects; and a save events listener module for detecting saves of the Custom Objects and the standard objects.

10. The system of claim 1, further comprising a read/write module for reading data out of the storage items and writing data reflecting the changed data and the saved data of the application items and Custom Objects into the storage items.

11. The system of claim 1, wherein the application items, Custom Sub-Objects and Custom Objects are any of:

a structured reference to other Custom Objects in the application;
mail messages;
contacts;
tasks;
meetings;
appointments;
documents;
files;
images;
videos;
text;
discussion;
standard graphical primitives;
text messages;
contact groups;
journal entries;
forms;
notes; and
task requests.

12. The system of claim 1, wherein operations with the Custom Objects representing the workflow include any of transitioning from the one state of the workflow to another, adding a new state to the workflow, deleting a state from the workflow, linking workflow states, and attaching a document to the Custom Object.

13. A computer-implemented method for synchronizing Custom Objects between an application and an External server, the method comprising performing the following steps on a computer having a processor and a memory:

(a) checking for an attempt to save the Custom Objects, wherein the Custom Objects are not supported by the application, wherein at least some of the Custom Object types include a workflow that represents a structured sequence of actions, and wherein the Custom Objects include the following:

(i) a hierarchy of comments posted by users in reply to other comments or in reply in a discussion, (ii) configurability for an number of subtasks for each task, and (iii) a structured reference to other Custom Objects in the application;

(b) managing the Custom Objects with a Custom Object manager using a graphical user interface and synchronizing the Custom Objects with the External server, wherein the application synchronizes only the modified fields of the Custom Objects with the External Server, and wherein the External server synchronizes the Custom Objects across multiple clients, (c) managing the workflow using the Custom Object manager;

(d) converting any standard application items supported by the application to Custom Objects, wherein the standard application items are synchronized to a first server that is located separately from the External server;

(e) transferring the changed data of the Custom Objects to the External Server, if the Custom Objects or the workflow were modified, created or deleted.

14. The method of claim 13, further comprising integrating a Custom Objects manager into the application for managing the Custom Objects and the workflow.

15. The method of claim 13, further comprising storing the changes of the Custom Objects on the local storage if the External Server is not accessible for the application.

16. The method of claim 13, further comprising synchronizing only the changed part of Custom Object and Custom Object workflow to the External Server.

17. The method of claim 13, further comprising synchronizing the Custom Objects stored on the local data storage with the Custom Objects stored on the External Server after establishing a connection between the application and the External Server.

18. The method of claim 13, wherein, if a conflict of the data to be written to the External Server and of the stored data is detected, the saving of the data of a changed Custom Object to the External Server is cancelled.

19. The method of claim 13, wherein data defining the Custom Object types, workflow and business rules are represented by Subject-Predicate-Object (SPO) triples.

20. The method of claim 19, wherein the triples are represented in any of N3, Turtle, XML, RDFa and N-Triples formats.

21. The method of claim 13, wherein the workflow states are determined by the state machine.

22. The method of claim 13, further comprising:
checking for changes of application items;
storing a list of changed fields of the application items, if changes are detected;
acquiring actual field values from the application items, if the changes are detected;
checking for save events in the application items;
sending the actual field values to an application server;
receiving update notifications from the application server;
receiving fields updated at the application server and new fields from the application server;
updating the application items with the received fields; and
synchronizing the application items with the application server.

23. The method of claim 22, further comprising:
checking for save events in the application items;
storing a list of changed fields of the application items in local storage items, if changes are detected;
checking for changes in the local storage items;
updating the local storage items.

24. The method of claim 22, further comprising checking whether changes made to an application item are meaningful.

25. The method of claim 22, further comprising forming a list of changed fields of the Custom Objects, the list including only meaningful changed fields.

26. The method of claim 22, further comprising checking whether changes made to the Custom Object are meaningful.

27. The method of claim 22, further comprising forming a list of saved fields of the Custom Objects, wherein the list including only meaningful changed fields.

28. A system for synchronizing objects between application and an External server, the system comprising:
a processor;
a memory coupled to the processor;
a computer program logic stored in the memory and executed on the processor, the computer program logic for implementing the steps of claim 13.

* * * * *